US011620725B2

(12) United States Patent
Renschler et al.

(10) Patent No.: US 11,620,725 B2
(45) Date of Patent: Apr. 4, 2023

(54) LOW LATENCY FRAME DELIVERY

(71) Applicant: QUALCOMM Incorporated, San Diego, CA (US)

(72) Inventors: Martin Renschler, San Diego, CA (US); Cullum James Baldwin, San Diego, CA (US); Michael Mager, San Diego, CA (US); Gautham Mayyuri, Carlsbad, CA (US); Bijan Forutanpour, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 7 days.

(21) Appl. No.: 17/354,792

(22) Filed: Jun. 22, 2021

(65) Prior Publication Data

US 2022/0261951 A1 Aug. 18, 2022

Related U.S. Application Data

(60) Provisional application No. 63/151,001, filed on Feb. 18, 2021.

(51) Int. Cl.
*G06T 1/60* (2006.01)
*G06T 3/00* (2006.01)
*H04N 5/235* (2006.01)
*G06T 11/00* (2006.01)
*G06T 5/00* (2006.01)

(52) U.S. Cl.
CPC ............. *G06T 1/60* (2013.01); *G06T 3/0093* (2013.01); *G06T 5/006* (2013.01); *G06T 11/00* (2013.01); *H04N 5/2353* (2013.01)

(58) Field of Classification Search
CPC ...................................................... G06T 1/60
See application file for complete search history.

(56) References Cited

U.S. PATENT DOCUMENTS

| | | |
|---|---|---|
| 2014/0187331 A1 | 7/2014 | Kim et al. |
| 2015/0016661 A1* | 1/2015 | Lord ............... H04L 51/10 382/100 |
| 2020/0058152 A1 | 2/2020 | Zhang et al. |
| 2020/0139234 A1 | 5/2020 | Hicks et al. |
| 2021/0304706 A1* | 9/2021 | Petrangeli ........... G06F 16/487 |

OTHER PUBLICATIONS

International Search Report and Written Opinion—PCT/US2022/014979—ISA/EPO—dated Jun. 3, 2022.

* cited by examiner

*Primary Examiner* — Shivang I Patel
(74) *Attorney, Agent, or Firm* — Qualcomm Incorporated

(57) ABSTRACT

Examples are described of marking specified regions of stored image frame buffer data in an image frame buffer. An imaging system can read the specified regions of the image frame buffer to identify whether the marking has been overwritten or not. The imaging system can thus efficiently identify how much of the image frame buffer has been overwritten with data from a new image frame. Based on this, the imaging system can retrieve partial image frame data from the image frame buffer and can process the partial image frame data, for instance to composite the partial image frame data with virtual content and/or to perform distortion compensation. The processed partial image frame data can be uploaded to a display buffer and displayed by a display, either as-is or once more of the frame is captured and processed. The imaging system can also perform auto-exposure using the partial image frame data.

30 Claims, 12 Drawing Sheets

LOW LATENCY FRAME DELIVERY

CROSS-REFERENCE TO RELATED APPLICATIONS

This application claims the benefit of U.S. Provisional Application No. 63/151,001, filed Feb. 18, 2021 and titled "Low Latency Frame Delivery for Extended Reality," which is hereby incorporated by reference in its entirety and for all purposes.

FIELD

This application is related to image processing. More specifically, aspects of this application relate to systems and methods of efficiently processing buffered image data for display.

BACKGROUND

An extended reality (XR) device is a device that displays an environment to a user, for example through a head-mounted display (HMD) or other device. The environment is at least partially different from the real-world environment in which the user is in. The user can generally change their view of the environment interactively, for example by tilting or moving the HMD or other device. Virtual reality (VR) and augmented reality (AR) are examples of XR.

An image sensor of an image capture device can capture an image of a scene. Traditionally, before a software application running on a processor receives access to the image of the scene from the image sensor, the entire image frame must complete capture and processing. Traditionally, a negotiation process between hardware drivers, an operating system, and the software application must also complete before the software application receives access to the image frame. These processes all introduce lag between capture of an image frame and display of the same image frame. Applications such as XR can introduce further lag by processing image frames (e.g., to insert virtual content) before displaying the image frames. The delay between a real-world movement and display of a representation of that movement on a display screen can be referred to as motion-to-photon latency. In applications where latency between camera and display is a priority, such as XR, such lag can make the displayed environment appear out-of-sync with the real world, can cause movements in the displayed environment to appear jittery or stuttery, and can cause users to feel nauseous.

SUMMARY

Systems and techniques are described herein for image processing for quick receipt of partial image frames at an application. An image processing system marks existing image frame buffer data in an image frame buffer with watermarks (and/or other metadata) at in one or more predetermined regions. An image sensor captures image frame data corresponding to an image frame, and gradually fills the image frame buffer with the image frame data as the image sensor captures the image frame and/or once some early image processing tasks (e.g., demosaicking and/or color space conversion) complete. The image processing system can read the memory at one or more of the predetermined regions to identify which of the watermarks (and/or other metadata) still remain in the image frame buffer, and which of the watermarks have been overwritten by new or alternate data, such as the image frame data. The image processing system can efficiently identify, based on which watermarks have been overwritten by the image frame data, that at least a predetermined amount (e.g., percentage) of the image frame has been captured and stored in the image frame buffer. For example, if the image processing system determines that a watermark positioned at the halfway point of the image frame buffer has been overwritten by the image frame data, then the image processing system knows that at least 50% of the image frame has been captured and is now stored in the image frame buffer. The image processing system can output a portion of the image frame corresponding to the predetermined percentage to a software application, to a display buffer, to a display controller, and/or to a display. For instance, if the image processing system knows that at least a first half of the image frame has been captured and is now stored in the image frame buffer, the image processing system can output the first half of the image frame to a software application, which can process the first half of the image frame (e.g., to introduce virtual content) and send the processed half of the image frame to a display buffer. Once the rest of the image frame (e.g., the second half of the image frame) is received in the image frame buffer, the software application can process the rest of the image frame and send the processed rest of the image frame to the display buffer. The display buffer can display the image frame. In an illustrative example, use of partial image frame access through image frame buffer watermarking can reduce lag from capture to display of an image frame from 67 milliseconds (ms) to 14.2 ms.

In one example, an apparatus for image processing is provided. The apparatus includes a memory and one or more processors (e.g., implemented in circuitry) coupled to the memory. The one or more processors are configured to and can: store, in an image frame buffer, data marked with metadata at a predetermined region of the image frame buffer; receive, from an image sensor, image frame data corresponding to an image frame; overwrite at least some of the stored data in the image frame buffer with the image frame data; determine that the image frame data includes at least a predetermined amount of the image frame based on a read of the predetermined region of the image frame buffer indicating that the predetermined region stores additional data that is different than the metadata; and output at least a first portion of the image frame data corresponding to the predetermined amount of the image frame.

In another example, a method of image processing is provided. The method includes: storing, in an image frame buffer, data marked with metadata at a predetermined region of the image frame buffer; receiving, from an image sensor, image frame data corresponding to an image frame; overwriting at least some of the stored data in the image frame buffer with the image frame data; determining that the image frame data includes at least a predetermined amount of the image frame based on a read of the predetermined region of the image frame buffer indicating that the predetermined region stores additional data that is different than the metadata; and outputting at least a first portion of the image frame data corresponding to the predetermined amount of the image frame.

In another example, a non-transitory computer-readable medium is provided that has stored thereon instructions that, when executed by one or more processors, cause the one or more processors to: store, in an image frame buffer, data marked with metadata at a predetermined region of the image frame buffer; receive, from an image sensor, image frame data corresponding to an image frame; overwrite at least some of the stored data in the image frame buffer with the image frame data; determine that the image frame data includes at least a predetermined amount of the image frame based on a read of the predetermined region of the image frame buffer indicating that the predetermined region stores additional data that is different than the metadata; and output at least a first portion of the image frame data corresponding to the predetermined amount of the image frame.

In another example, an apparatus for image processing is provided. The apparatus includes means for storing, in an image frame buffer, data marked with metadata at a predetermined region of the image frame buffer; means for receiving, from an image sensor, image frame data corresponding to an image frame; means for overwriting at least some of the stored data in the image frame buffer with the image frame data; means for determining that the image frame data includes at least a predetermined amount of the image frame based on a read of the predetermined region of the image frame buffer indicating that the predetermined region stores additional data that is different than the metadata; and means for outputting at least a first portion of the image frame data corresponding to the predetermined amount of the image frame.

In some aspects, the additional data is at least a portion of the image frame data.

In some aspects, to output the first portion of the image frame data, the one or more processors are configured to process the first portion of the image frame data. In some aspects, to process the first portion of the image frame data, the one or more processors are configured to modify at least some of the first portion of the image frame data using at least one of a distortion, a distortion compensation, and a warping.

In some aspects, to output the first portion of the image frame data, the one or more processors are configured to warp at least some of the first portion of the image frame data. In some aspects, to output the first portion of the image frame data, the one or more processors are configured to distort at least some of the first portion of the image frame data. In some aspects, to output the first portion of the image frame data, the one or more processors are configured to perform distortion compensation on at least some of the first portion of the image frame data.

In some aspects, to output the first portion of the image frame data, the one or more processors are configured to process the first portion of the image frame data using an extended reality (XR) application. In some aspects, to output the first portion of the image frame data, the one or more processors are configured to composite the first portion of the image frame data with virtual content. In some aspects, the methods, apparatuses, and computer-readable medium described above further comprise: identifying a pose of the image sensor; and rendering the virtual content based on a pose of the image sensor In some aspects, to output the first portion of the image frame data, the one or more processors store the first portion of the image frame data in a display buffer. In some aspects, the methods, apparatuses, and computer-readable medium described above further comprise: the display buffer.

In some aspects, to output the first portion of the image frame data, the one or more processors display the first portion of the image frame data using a display. In some aspects, the methods, apparatuses, and computer-readable medium described above further comprise: the display.

In some aspects, to output the first portion of the image frame data, the one or more processors send the first portion of the image frame data to a recipient device using a communication transceiver. In some aspects, the methods, apparatuses, and computer-readable medium described above further comprise: the communication transceiver.

In some aspects, to output the first portion of the image frame data, the one or more processors are configured to: determine one or more image statistics based on at least the first portion of the image frame data; and determine an image capture setting based on the one or more image statistics. In some aspects, the methods, apparatuses, and computer-readable medium described above further comprise: sending the image capture setting to image capture hardware, wherein the image capture hardware includes the image sensor; and receiving, from the image sensor, secondary image frame data corresponding to a second image frame, wherein the image sensor captures the second image frame based on the image capture setting. In some aspects, the image capture setting is an exposure setting.

In some aspects, the methods, apparatuses, and computer-readable medium described above further comprise: marking the stored data with the metadata at the predetermined region of the image frame buffer In some aspects, the metadata includes a pattern of colors. In some aspects, the metadata includes a frame identifier associated with the image frame. In some aspects, the metadata includes an image frame buffer identifier associated with the image frame buffer.

In some aspects, to determine that the image frame data includes at least a predetermined amount of the image frame, the one or more processors are configured to: read the predetermined region of the image frame buffer; and determine, based on the read of the predetermined region of the image frame buffer, that the read indicates that the predetermined region stores the additional data that is different than the metadata.

In some aspects, the stored data includes prior image frame data from a prior image frame, the prior image frame captured before capture of the image frame.

In some aspects, to output at least the first portion of the image frame data, the one or more processors are configured to output the image frame.

In some aspects, the existing data is marked with second metadata at a second predetermined region of the image frame buffer. In some aspects, the methods, apparatuses, and computer-readable medium described above further comprise: determining that the image frame data includes at least a second predetermined amount of the image frame based on a second read of the second predetermined region of the image frame buffer indicating that the second predetermined region stores secondary additional data that is different than the second metadata; and output at least a second portion of the image frame data corresponding to the second predetermined amount of the image frame.

In some aspects, the methods, apparatuses, and computer-readable medium described above further comprise: receiving a request for a view of a scene; and exposing the image sensor to light from the scene automatically in response to receipt of the request, wherein the image frame data received from the image sensor is based on exposure of the image sensor to the light from the scene In some aspects, the apparatus is a mobile device. In some aspects, the apparatus is a wireless communication device. In some aspects, the apparatus is a head-mounted display. In some aspects, the apparatus is a camera. In some aspects, the methods, apparatuses, and computer-readable medium described above further comprise: the image sensor. In some aspects, the methods, apparatuses, and computer-readable medium described above further comprise: the image frame buffer.

In some aspects, the metadata includes a watermark.

In some aspects, the predetermined amount of the image frame includes a predetermined percentage of the image frame. In some aspects, the predetermined amount of the new image frame includes a predetermined fraction of the image frame. In some aspects, the predetermined amount of the image frame includes a predetermined number of rows of the image frame. In some aspects, the predetermined amount of the image frame includes a predetermined number of columns of the image frame. In some aspects, the predetermined amount of the image frame includes a predetermined number of pixels of the image frame.

In some aspects, the apparatus comprises a camera, a mobile device, a mobile telephone, a smart phone, a mobile handset, a portable gaming device, a wireless communication device, a smart watch, a wearable device, a head-mounted display (HMD), an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image. In some aspects, the apparatus further includes a display for displaying the image, one or more notifications (e.g., associated with processing of the image), and/or other displayable data. In some aspects, the display displays the image after the one or more processors process the image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
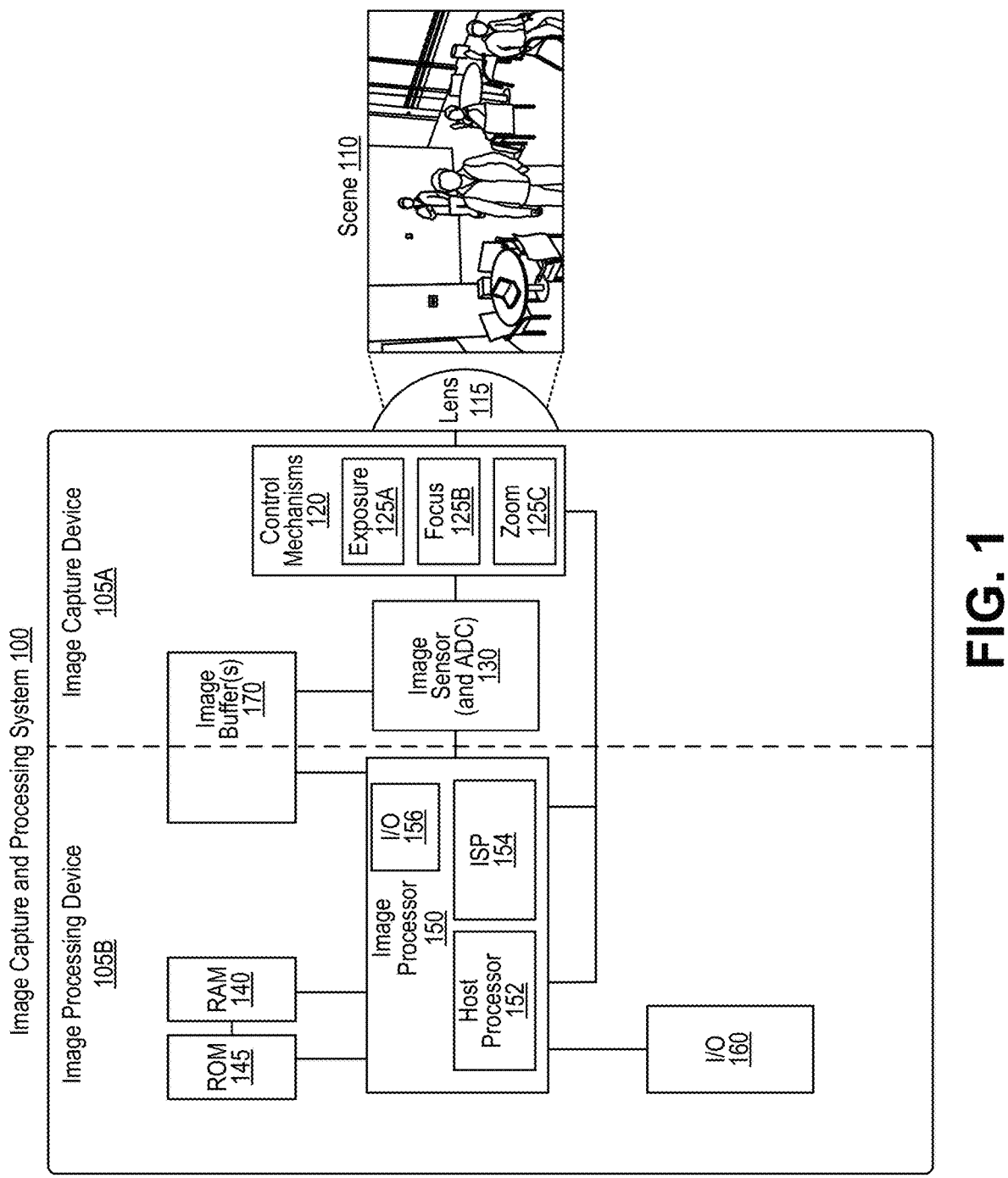
FIG. 1 is a block diagram illustrating an architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

An extended reality (XR) device is a device that displays an environment to a user, for example through a head-mounted display (HMD), a mobile handset, a wearable device, or another device. XR can include, for example, virtual reality (VR), augmented reality (AR), mixed reality (MR), and combinations thereof. The environment displayed by the XR device can be at least partially different from the real-world environment in which the user is in. For example, in VR the environment displayed by the XR device can be entirely virtual or almost entirely virtual. In some cases, VR can still be based on the real-world environment that the user is in, as the XR device can for example make the boundaries of its virtual environment similar to the boundaries of the real-world environment that the user is in, or can incorporate virtual characters positions matching the positions of other users in the real-world environment that the user is in. In AR or MR, the environment displayed by the XR device can be a mixture of the real-world environment that the user is in with virtual content that augments the user's experience. The user can generally change their view of the environment interactively, for example by tilting and/or rotating and/or moving the XR device. If the XR device is an HMD or a mobile handset, the user can tilt and/or rotate the XR device and/or can moving throughout the real-world environment that the user is in while the user wears or holds the XR device.

An image sensor of an image capture device can capture an image of a scene. In some devices, before a software application running on a processor receives access to the image of the scene from the image sensor, the entire image frame must complete capture. Even in image capture devices that are capable of high-speed image frame capture rates such as 90 frames per second (FPS), capture of an image frame in its entirely takes approximately 11 milliseconds (ms). In some devices, a negotiation process between application programming interfaces (APIs) of hardware drivers, an operating system (OS), and the software application must also complete before the software application receives access to the image frame. This negotiation process may include multiple API layers. For example, the negotiation process may include camera hardware events being sent to an OS kernel, the OS kernel communicating with the OS kernel's camera drivers, the OS kernel's camera drivers interacting with user-space camera drivers that reside in user-space, the user-space camera drivers communicating with a high-level OS (HLOS) camera service, and the HLOS camera service finally communicating with the software application. Each layer in this negotiation process can involve API calls for these different elements. Waiting for capture of the entire image frame, combined with this negotiation process, can introduce significant lag between capture of an image frame and display of the same image frame. Each of these API layers can require scheduling tasks that compete for common and limited CPU resources.

Applications such as XR can introduce further lag by processing image frames (e.g., to insert virtual content, to perform distortion compensation, processing related to camera intrinsic calibration, processing related to camera extrinsic calibration, processing relating to consistency between left and right frames in a stereoscopic system, to perform color correction, etc.) before displaying the image frames. Fully processing each image and the associated API call complexity can lead delays in providing the camera images to a GPU warp compositor and contribute significantly to photon to motion latency in see-through XR applications. In applications where latency between camera and display is a priority, such as XR, such lag can make the displayed environment appear out-of-sync with the real world, can cause movements in the displayed environment to appear jittery or stuttery, can cause scheduling delays throughout the application and/or OS, and can cause users to feel nauseous or otherwise unwell.

Setting image capture settings such as exposure, focus, or zoom, can also introduce lag or latency. Automated image capture settings adjustments, such as auto-exposure, auto-focus, and auto-zoom, can set values for image capture settings based on prior images captured by an image sensor. Such processes may need to capture the prior images, pass the prior images through system buffers or queues, and analyze the prior image to obtain image statistics before a new image capture setting can be determined based on the image statistics. Once the new image capture setting is determined, the image capture setting may need to pass through various buffers, queues, kernels, and/or hardware actuators before the image capture setting is actually applied to an image. All of these steps can take additional time, potentially adding additional latency.

Systems and techniques are described herein for image processing for quick receipt of partial image frames from an image frame buffer at a software application. An image processing system watermarks stored image frame buffer data in an image frame buffer at one or more watermark positions or regions within the image frame buffer. An image sensor captures image frame data corresponding to an image frame, and gradually fills the image frame buffer with the image frame data as the image sensor captures the image frame. The image processing system can read the memory at one or more of the watermark positions or regions within the image frame buffer to identify which of the watermarks still remain in the image frame buffer, and which of the watermarks have been overwritten by other data (the image frame data). The image processing system can efficiently identify, based on which watermarks have been overwritten by the image frame data, that at least a predetermined amount (e.g., percentage, fraction, proportion) of the image frame has been captured and stored in the image frame buffer. For example, if the image processing system determines that a watermark positioned at the halfway point of the image frame buffer has been overwritten by the image frame data, then the image processing system knows that at least 50% of the image frame has been captured and is now stored in the image frame buffer. The image processing system can output a portion of the image frame corresponding to the predetermined amount to a software application, to a display buffer, to a display controller, and/or to a display. For instance, if the image processing system knows that at least a first half of the image frame has been captured and is now stored in the image frame buffer, the image processing system can output the first half of the image frame to a software application, which can process the first half of the image frame. In some examples processing the first half of the image frame) can introduce virtual content into the partial image frame by compositing the first half of the image frame with the virtual content. The image processing system can send the processed half of the image frame to a display buffer. In some cases, the image processing system can output the portion of the image frame corresponding to the predetermined amount of the image frame to an image capture settings determination controller that can use the portion of the image frame for auto-exposure, auto-focus, auto-zoom, or a combination thereof.

By reading directly from the image buffer, much of the negotiation process between hardware drivers, an operating system, and the software application can be bypassed. Because checking how much of the image frame is currently stored in the image buffer can be done very quickly (e.g., through a quick memory read at a watermark position for one or more watermarks), a partial image frame can be reliably sent with certainty that the partial image frame includes data from the newly captured image frame and not any pre-existing data in the image frame buffer. A processor that receives partial image frames can process the partial image frames while the rest of the image frame is still being captured, reducing wasted time. In examples where image frame data is composited with virtual content, a camera frame rate can by synchronized in rate and/or in phase with the virtual content.

In some examples, a display can immediately display the processed half of the image frame from the display buffer. For example, an organic light emitting diode (OLED) display may be used this way. In some examples, once the rest of the image frame (e.g., the second half of the image frame) is received in the image frame buffer, the software application can process the rest of the image frame and send the processed rest of the image frame to the display buffer. The display buffer can display the image frame. For example, a liquid crystal display (LCD) display may be used this way. In an illustrative example, use of partial image frame access through image frame buffer watermarking can reduce lag from capture to display of an image frame from 67 ms to 14.2 ms.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing system 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1020, read-only memory (ROM) 145 and/or 1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing system coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 of FIG. 1 includes one or more image buffers 170. The one or more image buffers 170 can each include one or more image frame buffers. Each image frame buffer can temporarily store a single image frame that is captured by the image sensor 130 and/or processed by the image processor 150. In some examples, an image frame buffer can be, or can include, a circular buffer, a circular queue, a cyclic buffer, a ring buffer, or a combination thereof. In some examples, the one or more image buffers 170 can receive and store partial image frame data from an image frame before the entirety of the image has completed capturing. In some examples, image frame data from a new image frame overwrites older existing image buffer data in an image frame buffer. The one or more image buffers 170 are illustrated as coupled to both the image sensor 130 and the image processor 150. In some examples, the image processor 150 receives image frames from the image sensor 130 through the image buffer 170. In some examples, the image buffer may be coupled only to the image sensor 130 and not the image processor 150. In some examples, the image buffer may be coupled only to the image processor 150 and not the image sensor 130.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 Wi-Fi communications, wireless local area network (WLAN) communications, or some combination thereof. In some implementations, the image capture device 105A and the image processing device 105B can be different devices. For instance, the image capture device 105A can include a camera device and the image processing device 105B can include a computing system, such as a mobile handset, a desktop computer, or other computing system.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
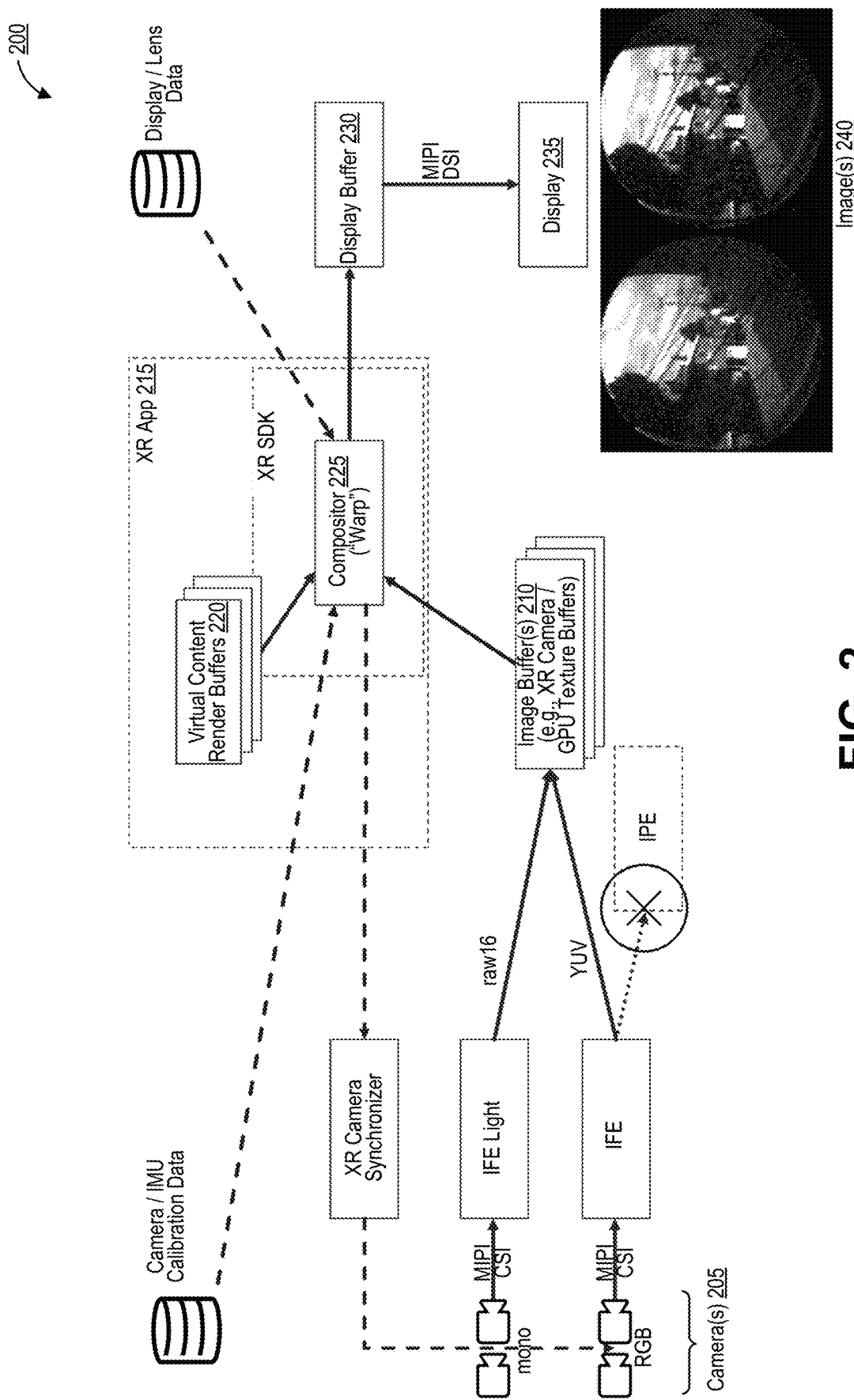
FIG. 2 is a block diagram illustrating an architecture of an extended reality (XR) system, in accordance with some examples.

FIG. 2 is a block diagram illustrating an architecture of an extended reality (XR) system 200. The XR system 200 of FIG. 2 includes one or more cameras 205. Each camera of the cameras 205 may be an example of an image capture device 105A, an image processing device 105B, an image capture and processing device 100, or a combination thereof. For example, four cameras 205 are illustrated in FIG. 2, each having an image sensor. Two of the cameras 205 illustrated in FIG. 2 are visible light cameras with image sensors that are sensitive to light from the visible light spectrum and that each output a color image. These two cameras are labeled in FIG. 2 as red-green-blue (RGB) cameras. Two of the cameras 205 illustrated in FIG. 2 each output monochrome images. These two cameras are labeled in FIG. 2 as monochrome (mono) cameras. The cameras 205 each capture image frame data corresponding to at least a portion of one or more image frames. The image frame data from each of the cameras 205 passes to one or more image front ends (IFEs) along one or more interfaces, such as a camera serial interface (CSI), a mobile industry processor interface (MIPI), or a combination thereof. The IFE(s) can be examples of at least part of an image processing device 105B. The IFE(s) can perform certain image processing tasks described as performed by the ISP 154, the DSP 152, or the image processor 150. For instance, the IFE(s) can perform demosaicking, color space conversion, color format conversion, bad pixel correction, or a combination thereof. For example, the IFE(s) can convert image frame data from the RGB camera into the YUV color space. The IFE(s) can convert image frame data from the monochrome camera into the raw16 color space. The IFE(s) can send the image frame data, optionally with these color space conversions and/or other image processing operations applied, to one or more image buffers 210. In some examples, an IFE can send the image frame data to an image processing engine (IPE). In some examples, the IPE can perform more heavy processing, such as skin color corrections, sky color corrections, face detection, red eye removal, and so forth. In some examples, the IPE can introduce more scheduling and processing latency (and therefore jitter and/or stuttering). The IPE may be bypassed in some examples, as indicated by the "X" mark in FIG. 2. In some examples, at least some of the operations described herein as performed by the IPE(s) may be performed by the IFE(s). In some examples, at least some of the operations described herein as performed by the IFE(s) may be performed by the IPE(s).

The one or more image buffers 210 can be examples of the one or more image buffers 170 of the image capture and processing device 100 of FIG. 1. For instance, each image buffer of the one or more image buffers 210 can include one or more image frame buffers that can store image frame data corresponding to a specific image frame from one or more of the cameras 205. In some examples, the one or more image buffers 210 are stored as graphics processor unit (GPU) texture buffers. In some examples, the one or more image buffers 210 are stored as XR camera buffers.

Image frame data corresponding to partial image frames or whole image frames may be transferred from the image buffer(s) 210 to an XR application 215. The XR application 215 can generate virtual content to be overlaid over, merged with, or otherwise composited with the image frame data from the image buffer(s) 210 using a compositor 225 of the XR application 215. The virtual content can be generated, rendered, and stored in one or more virtual content render buffers 220 before being composited with the image frame data from the image buffer(s) 210 using the compositor 225. In some examples, the virtual content render buffers 220 may be referred to as virtual render buffers, virtual content buffers, game render buffers, video game render buffers, in-game content render buffers, or a combination thereof. Video gaming is one exemplary use case of XR devices in which virtual content is generated and/or rendered, for example representing in-game characters, in-game items, in-game costumes, in-game areas, other in-game objects, or combinations thereof. The virtual content render buffer(s) 220 can also be referred to as virtual content buffers. The XR application 215 may include an XR software development kit (SDK), which may include the compositor 225 and/or other image processing functions. Developers of an XR application 215, such as a game, can call the compositor 225 and/or other image processing functions of the XR SDK. In some examples, the XR SDK can be an XR API. The compositing performed by the compositor 225 can be referred to as warping.

The compositor 225 generates composited image frame data by compositing image frame data from an image frame buffer of the image buffer(s) 210 together with virtual content from the virtual content render buffer(s) 220. If the image frame data is only a partial image frame (e.g., includes only a portion of an image frame), the composited image frame data is composited based on the partial image frame. The composited image frame data can be referred to as composited image data, composited frame data, composited images, composited image frames, composited partial image frame data composited partial image data, composited partial frame data, composited partial images, composited partial image frames, display image frame data, display image data, display frame data, display images, display image frames, display partial image frame data, display partial image data, display partial frame data, display partial images, display partial image frames, or a combination thereof. The XR application 215 sends the composited image frame data to a display buffer 230. The display buffer 230 may be referred to as a screen buffer. In some examples, the display buffer 230 sends the composited image frame data to the display 235 to be displayed on the display 235 once the display buffer 230 receives the composited image frame data. In some examples, once the display buffer 230 receives composited image frame data corresponding to an entire image frame, the display buffer 230 sends the composited image frame data corresponding to the entire image frame to the display 235 to be displayed on the display 235. For instance, the compositor 225 can receive multiple portions of the same image frame from the image buffer(s) 210 at different times, can generate multiple sets of composited image frame data based on these portions, and can send the sets of composited image frame data to the display buffer 230 upon generating each of the sets of composited image frame data. Once the display buffer 230 receives all of the sets of composited image frame data from the compositor 225 that correspond to the image frame, the display 235 can display the entire image frame (with the virtual content composited in by the compositor 225) as stored in the display buffer 230.

In some examples, the compositor 225 may perform other image processing tasks other than compositing the image frame data from the image buffer(s) 210 and the virtual content from the virtual content render buffer(s) 220. The compositor 225 can perform any image processing tasks described as performed by the ISP 154, the DSP 152, and/or the image processor 150. The compositor 225 may perform distortion compensation, processing related to camera intrinsic calibration, processing related to camera extrinsic calibration, processing relating to consistency between left and right frames in a stereoscopic system, color correction, brightness correction, contrast correction, white balance correction, black balance correction, saturation correction, or combinations thereof. Some of these processing tasks may take advantage of additional data received by the XR application 215, such as sensor data from the cameras 205, an inertial measurement unit (IMU), calibration data from intrinsic calibration of the cameras 205, calibration data from extrinsic calibration of the cameras 205 (e.g., relative to one another), properties of the display 235, properties of one or more lenses of the cameras 205, properties of one or more lenses positioned between the display 235 and a viewer, or a combination thereof. The composited image frame data from the display buffer 230 can pass to the display 235 along one or more interfaces, such as a display serial interface (DSI), a mobile industry processor interface (MIPI), or a combination thereof.

Distortion compensation may compensate for or correct distortion caused by the cameras 205, for instance by reducing radial distortion caused by wide-angle lenses. Distortion compensation may compensate for or correct distortion caused by the display 235, for instance to make proportions in an environment appear accurate to a viewer of the display 235 based on properties of the display 235 and of the viewing of the display 235, such as the display 235's curvature, the display 235's flatness, the distance between the display 235 and one or both eye(s) of the viewer, the view angle between the display 235 and one or both eye(s) of the viewer, optical properties of one or more lenses between the display 235 and one or both eye(s) of the viewer, effects of glare and/or shadows and/or transparency and/or other lighting effects on the display 235, or a combination thereof. Distortion compensation may compensate for perspective distortion.

In some examples, the image buffer(s) 210 can be shared between the IFE and a GPU, and tightly synced without API calls through all layers. Thus, the GPU warping (e.g., using compositor engine 225) can access the pixel of an image frame and output processed (warped) frames based on the metadata in a faster manner than receiving fully processed frames from the image processing engine.

In some examples, cameras 205 may include pair stereoscopic cameras to produce a stereoscopic view in the display 235. For example, the exemplary images 240 illustrated in FIG. 2 as displayed on the display 235 include a left image and a right image. The processing may include processing related to camera intrinsic calibration, as each of the cameras may undergo intrinsically calibration so that processing can correct issues due to intrinsic properties of the cameras 205, such as slight manufacturing defects or differences, or slight differences in the coupling between the cameras 205 and the housing of the XR device. The processing may include processing related to camera extrinsic calibration, as the two cameras may undergo an extrinsic calibration to account for slight differences between the cameras and slight changes in positioning between the cameras due to intrinsic properties of the cameras and/or the XR device. The processing may relate to consistency between left and right frames in a stereoscopic system, for instance to ensure that brightness levels, contrast levels, color levels, white balance, black balance, saturation, and other image properties are similar in the left image compared to the right image.

In some examples, cameras 205 may be synchronized with the data from the XR application 215 via a XR camera synchronizer. The XR camera synchronizer can, for instance, synchronize virtual data from the virtual content render buffers 220 with camera data so that the image buffers 210 and virtual content render buffers 220 include data corresponding to the same or similar times.

In some examples, camera frame rates of the cameras 205 can be controlled by the XR camera synchronizer, in small or large increments. By controlling camera frame rates, the XR camera synchronizer can synchronize the cameras 205 with the virtual content in rate and/or in phase. For example, the XR camera synchronizer can synchronize the cameras 205 with the virtual content so that a particular fill level is complete when the image processing needs that data, thus avoiding wait time on the image processing side. Rather than polling for a fill level to be achieved, an image processor of the XR system 200 merely has to prove that the fill level has been established thus proving that the camera is still in sync. Using tight synchronization can eliminate latency from data having been received in the buffer until that data can be consumed.

Figure 3:
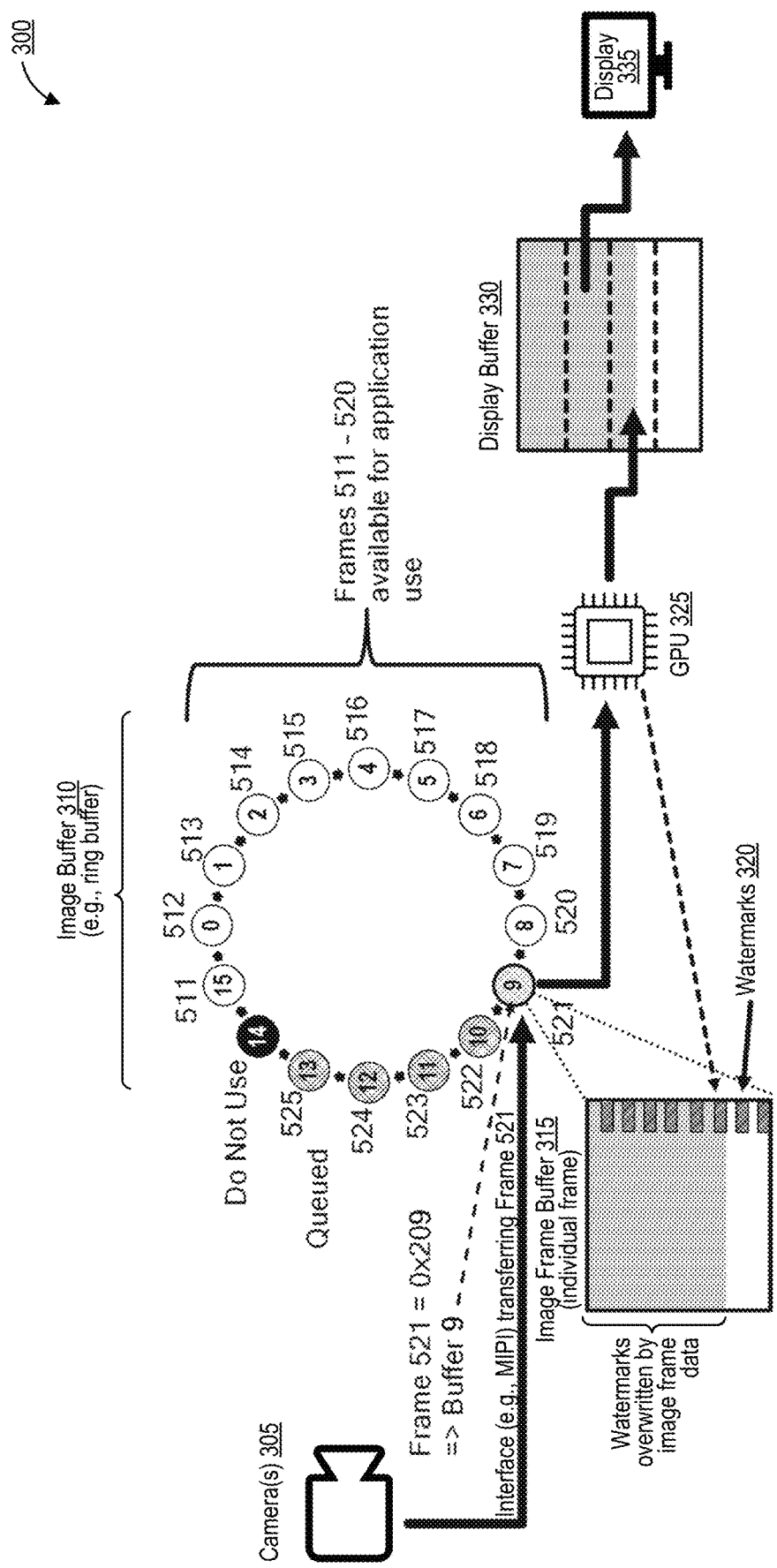
FIG. 3 is a conceptual diagram illustrating an imaging system with a graphics processing unit (GPU) determining how full of image frame data an image frame buffer is based on watermarks in the image frame buffer, in accordance with some examples.

FIG. 3 is a conceptual diagram illustrating an imaging system 300 with an graphics processing unit (GPU) 325 determining how full of image frame data an image frame buffer 315 is based on watermarks 320 in the image frame buffer 315. One or more cameras 305 are illustrated in FIG. 3. Each camera of the cameras 305 may be an example of an image capture device 105A, an image processing device 105B, an image capture and processing device 100, one of the one or more cameras 205, or a combination thereof. Image frame data is captured by the one or more cameras 305 and stored in an image buffer 310. The image buffer 310 of FIG. 3 can be an example of the image buffer(s) 210 of FIG. 2. The image buffer 310 of FIG. 3 is a ring buffer, also referred to as a circular buffer. The image buffer 310 of FIG. 3 includes 16 image frame buffers, each depicted as a circle with a black outline and a numeric label within the circle. The 15 image frame buffers of the image buffer 310 of FIG. 3 are labeled "0" through "15." Each image frame buffer's numeric label ("0" through "15") is illustrated within the circle representing the image frame buffer. Each image frame buffer of the image buffer 310 of FIG. 3 is capable of storing an entire image frame. In the example of FIG. 3, image frame buffer 15 stores frame 511, image frame buffer 0 stores frame 512, image frame buffer 1 stores frame 513, image frame buffer 2 stores frame 514, image frame buffer 3 stores frame 515, image frame buffer 4 stores frame 516, image frame buffer 5 stores frame 517, image frame buffer 6 stores frame 518, image frame buffer 7 stores frame 519, image frame buffer 8 stores frame 520, image frame buffer 9 partially stores frame 521, image frame buffer 10 is scheduled to store frame 522, image frame buffer 11 is scheduled to store frame 523, image frame buffer 12 is scheduled to store frame 524, image frame buffer 13 is scheduled to store frame 523, and image frame buffer 14 is unused. Image frames 511 through 520 are stored in image frame buffers 15 and 0 through 8, and are available for use by an application (e.g., the XR application 215 of FIG. 2). Image frame buffers 15 and 0 through 8 are illustrated as white circles to indicate their availability for the application. Image frames 522 through 525 have not yet been captured by the camera(s) 305, and are scheduled to be stored in image frame buffers 10 through 13. Thus, image frames 522 through 525—and image frame buffers 10 through 13—are not available for use by the application. Image frame buffers 10 through 13 are illustrated with a crosshatched pattern to indicate their unavailability for the application. Image frame buffer 14 is unused to prevent race conditions, and is illustrated as a black circle to indicate this unused nature.

Image frame 521 is in the process of being captured by the camera(s) 305. Image frame data corresponding to a portion of image frame 521 is stored in image frame buffer 9. Image frame buffer 9 is illustrated with a dithered pattern to indicate that image frame buffer 9 already stores some portion of image frame 521, but does not store the entirety of image frame 521. Using the systems and techniques described herein, at least part of the image frame buffer 9 can be accessed by the application.

Image frame buffer 315 is a graphical representation of image frame buffer 9 according to some examples. Image frame buffer 315 is illustrated as a rectangle. The rectangle representing image frame buffer 315 includes a dithered shaded pattern from the top of the image frame buffer 315 extending until about two-thirds of the way into the image frame buffer 315, leaving the bottom third of the image frame buffer 315 white and unshaded. The dithered shaded pattern in the image frame buffer 315 represents image frame data corresponding to a portion of image frame 521. According to the shaded pattern in the image frame buffer 315, then, an image sensor of the camera(s) 305 has already captured (and stored in the image frame buffer 315) approximately two-thirds of the image frame 521.

The image frame buffer includes watermarks 320 at a number of positions. The watermarks 320 are illustrated in FIG. 3 as rectangles with diagonal lines throughout. An image processing system adds the watermarks 320 to existing data in the image frame buffer 315 before the image frame data from image frame 521 begins to be captured by the camera(s) 305 and stored in the image frame buffer 315. The watermarks 320 may be inserted periodically, for example once every 5% of the image frame's size, once every 10% of the image frame's size, once every 15% of the image frame's size, once every 20% of the image frame's size, once every 25% of the image frame's size, once every N rows of pixels of the image frame, once every M columns of pixels of the image frame, or some combination thereof. While the watermarks 320 are all illustrated on the right-hand side of the image frame buffer 315 of FIG. 3, the watermarks 320 may be located anywhere in the image frame buffer 315. Once the image frame data from image frame 521 begins to be captured by the camera(s) 305 and stored in the image frame buffer 315, the image frame data from image frame 521 overwrites the watermarks 320. Thus, while all of the watermarks 320 are still illustrated in FIG. 3 for the sake of illustrating how the watermarks 320 may be laid out, the new image frame data from image frame 521 (represented by the dithered shaded area) overwrites the watermarks 320 as the new image frame data overwrites the pre-existing image buffer data that was stored in the image frame buffer 315 before the new image frame data was stored in the image frame buffer 315.

The GPU 325 performs a memory read at one or more regions of the image frame buffer 315 corresponding to the one or more of the watermarks 320. For example, based on the dashed arrow, the GPU 325 performs a memory read of a region of the image frame buffer 315 corresponding to one of the watermarks 320 at approximately 66% of image frame buffer 315. The watermark 320 that was previously at this region was just overwritten by the new image frame data from image frame 521 (represented by the dithered shaded area). The GPU 315 identifies based on the memory read that the region no longer stores the watermark 320, and therefore must have been overwritten with (and now store) the new image frame data from image frame 521. Thus, the GPU 315 knows that at least 66% of image frame 521 has been captured and stored in the image frame buffer 315. In some cases, the GPU 315 can perform memory reads on other regions of the image frame buffer 315 corresponding to other watermarks 320 (e.g., after the watermark at 66%) to determine more precisely how much of the image frame 521 has been captured and stored in the image frame buffer 315. In the example illustrated in FIG. 3, however, 66% is accurate, which would be shown to the GPU 315 based on memory reads of further regions of the image frame buffer 315 corresponding to further watermarks 320 still storing their respective watermarks 320. The GPU 315 can retrieve the image frame data corresponding to the first 66% of the image frame 521. The GPU 315 can process the image frame data corresponding to the first 66% of the image frame 521 on behalf of the application (e.g., the XR application 215). The GPU can send the processed version of the image frame data corresponding to the first 66% of the image frame 521 to the display buffer 330. A rectangle representing the display buffer 330 includes a dithered shaded pattern from the top of the display buffer 330 extending until about two-thirds of the way into the display buffer 330, leaving the bottom third of the display buffer 330 white and unshaded. The dithered shaded pattern represents the processed partial image frame data from the GPU 325 (e.g., the first 66% of the image frame 521). In some examples, the display 335 can display the processed partial image frame data (e.g., the first 66% of the image frame 521). In some examples, the display 335 can wait until the display buffer 330 includes the entirety of the processed version of image frame 521 before displaying the processed version of image frame 521.

In some examples, the watermarks 320 include a visual pattern that would be unlikely to be found in an image. In some examples, the watermarks 320 can include a pattern of stripes of two alternating colors. For instance, the two alternating colors can include any combination of, black, white, a nearly-black dark grey, a nearly-white light grey, blue, red, green, cyan, magenta, yellow, primary color, secondary colors, tertiary colors, or other colors. In some examples, the watermarks 320 include any combination of visual patterns, such as checkerboard patterns, dithering patterns, horizontal stirpes, diagonal stripes, vertical stripes, crosshatch patterns, rainbow patterns, gradient patterns, or a combination thereof. In some examples, patterns for watermarks 320 may be selected from one of a set of predetermined patterns. In some examples, patterns for watermarks 320 may be selected by looping through the set of predetermined patterns. In some examples, patterns for watermarks 320 may be selected by selecting a pattern that is most likely to be different from the new image frame data from the new image frame from the set of predetermined patterns. For instance, if the camera 305 from which image data is being captured is a monochrome camera that only captures monochrome (greyscale) image data, then a colorful pattern would be unlikely to appear in image data captured by the camera 305 and may thus be optimal for use in a watermark 320. If the camera 305 from which image data is being captured is a full-color camera, then a true greyscale or black/white pattern (e.g., where saturation is zero) would be unlikely to appear in image data captured by the camera 305 and may thus be optimal for use in a watermark 320. In some examples, the watermarks 320 can include data such as a frame identifier (e.g., frame number 521 in FIG. 3), an image frame buffer identifier (e.g., image frame buffer number 9 in FIG. 3), or a combination thereof. In some example, each watermark includes a lead-in pattern as discussed above, a frame identifier, an image frame buffer identifier, and a lead-out pattern. In one illustrative example, the lead-in pattern may be 0x1FE01FE01FE01FEull. In one illustrative example, the lead-out pattern may be 0xFE01FE01FE01FE01ull. In some examples, each watermark includes an alignment mask to align the watermark to a region of the image frame buffer that can be easily read by the GPU 325.

Figure 4:
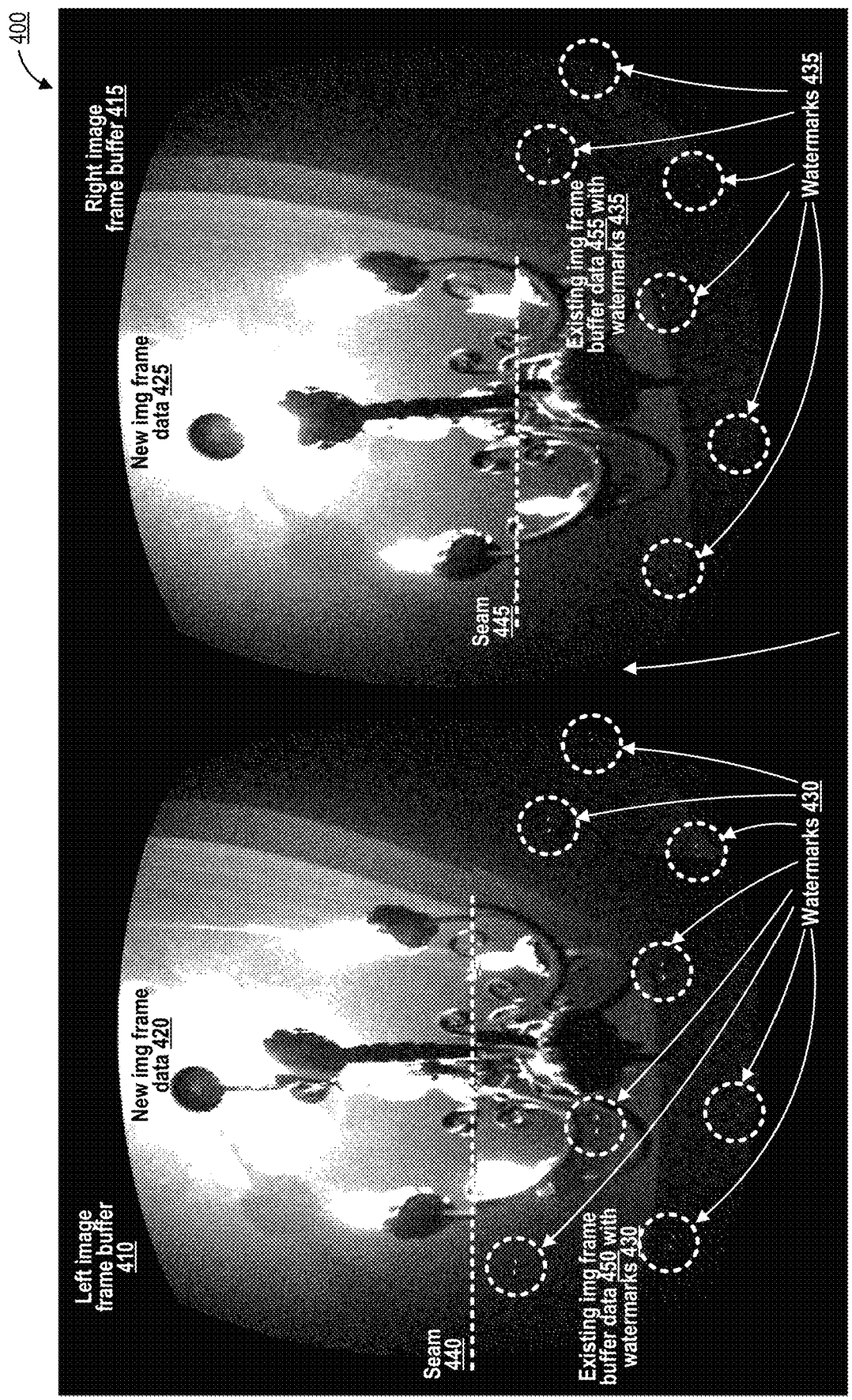
FIG. 4 is a conceptual diagram illustrating image frame data overwriting existing image frame buffer data with watermarks, in accordance with some examples.

FIG. 4 is a conceptual diagram 400 illustrating image frame data 420-425 overwriting existing image frame buffer data 450-455 with watermarks 430-435. A left image frame buffer 410 and a right image frame buffer 415 are illustrated. The left image frame buffer 410, towards its bottom, includes existing image frame buffer data 450 that includes watermarks 430. The watermarks 430 are examples of the watermarks 320, and are illustrated as white horizontal lines with a black stripe down the middle. The watermarks 430 are circled with white dashed circular outlines in FIG. 4 so that they can be more easily identified. The right image frame buffer 415, toward its bottom, includes existing image frame buffer data 455 that includes watermarks 435. The watermarks 435 are examples of the watermarks 320, and are illustrated as white horizontal lines with a black stripe down the middle. The watermarks 435 are circled with white dashed circular outlines in FIG. 4 so that they can be more easily identified.

The left image frame buffer 410 includes new image frame data 420 coming in from the top of the left image frame buffer 410 and overwriting the existing image frame buffer data 450 as the new image frame data 420 fills in more in a downward direction. The new image frame data 420 does not include watermarks. A seam 440 between the new image frame data 420 and the existing image frame buffer data 450 is highlighted with a white dashed line in FIG. 4. The right image frame buffer 415 includes new image frame data 425 coming in from the top of the right image frame buffer 415 and overwriting the existing image frame buffer data 455 as the new image frame data 425 fills in more in a downward direction. The new image frame data 425 does not include watermarks. A seam 445 between the new image frame data 425 and the existing image frame buffer data 455 is highlighted with a white dashed line in FIG. 4.

Figure 5:
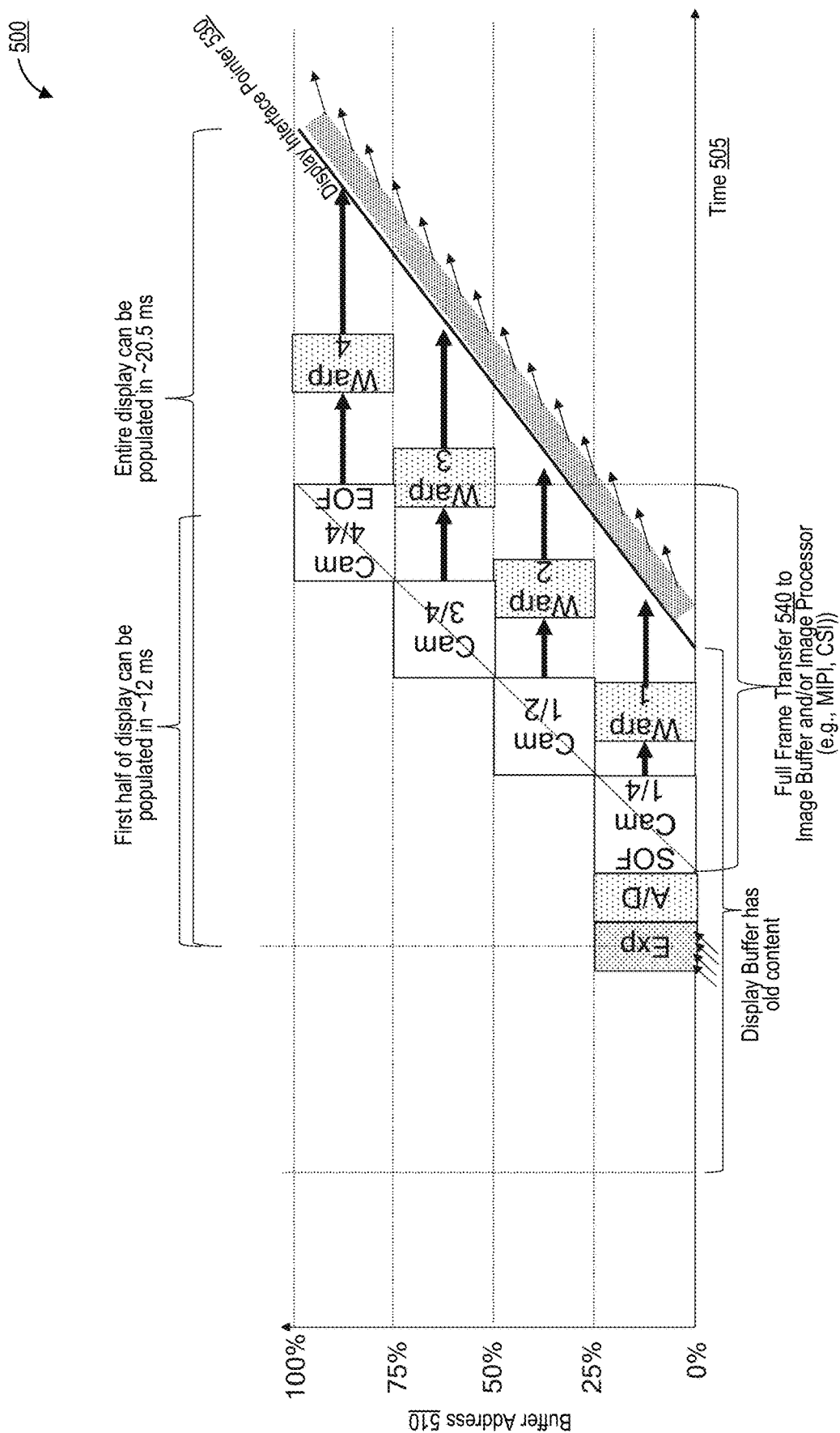
FIG. 5 is a conceptual diagram illustrating a timeline from initiation of capture of an image frame to display of the image frame, with the image frame processed and sent to the display buffer in four separate portions, in accordance with some examples.

FIG. 5 is a conceptual diagram 500 illustrating a timeline from initiation of capture of an image frame to display of the image frame, with the image frame processed and sent to the display buffer in four separate portions. In the conceptual diagram 500, the horizontal axis is a time axis 505, with time moving forward from left to right along the horizontal axis. In the conceptual diagram 500, the vertical axis indicates buffer address corresponding to capture and storage of an image frame, and is expressed as a percentage. The percentage indicates a percentage of the image frame that is captured and/or stored in an image frame buffer at a given time. The image frame is captured and stored in four quarters—a first quarter (marked ¼ and corresponding to the range of 0%-25%), a second quarter (marked 2/4 and corresponding to the range of 25%-50%), a third quarter (marked ¾ and corresponding to the range of 50%-75%), and a fourth quarter (marked 4/4 and corresponding to the range of 75%-100%).

In the timeline, exposure of the image sensor to light is identified with a box marked "Exp." Analog to digital conversion is identified with a box marked "A/D." The start of data transfer (e.g., over MIPI/CSI) from an image sensor 130 of camera(s) 100/105A/205/305 to an image buffer and/or image processor is marked as "SOF" for "Start of Frame." The end of data transfer (e.g., over MIPI/CSI) from an image sensor 130 of camera(s) 100/105A/205/305 to an image buffer and/or image processor is marked as "EOF" for "End of Frame." The transfer of the entire frame from the image sensor 130 to the image buffer and/or image processor, from the start of frame to the end of frame, is identified as the full frame transfer 540 to the image buffer and/or image processor. The frame data may be transferred over MIPI, CSI, or a combination thereof. The boxes marked "Cam" for each of the four quarters correspond to the image sensor capturing those quarters of the image frame and transferring the quarters of the image frame to the image frame buffer and/or image processor. The boxes marked "Warp" for each of the four quarters correspond to the image processing described herein as performed by image processor. The image processor can include the compositor 225, the XR application 215, the image processor 150, the host processor 152, the ISP 154, the GPU 325, or a combination thereof. The image processing operations corresponding to the "warp" boxes can include compositing (e.g., rendering virtual content and merging the rendered virtual with an image) as discussed with respect to the compositor 225, the XR application 215, the GPU 325. The image processing operations corresponding to the "warp" boxes can include other image processing operations discussed with respect to the compositor 225, the XR application 215, the image processor 150, the host processor 152, the ISP 154, the GPU 325, or a combination thereof. The diagonal line marked display interface pointer 530 corresponds to transfer of the processed partial image frame data (corresponding to the quarters of the image frame) to a display buffer and/or to a display. The display buffer may be, for example, the display buffer 230, the display buffer 330, or a combination thereof.

The display may be, for example, the display 235, the display 335, or a combination thereof. The display interface pointer 530 may point to the display buffer and/or the display using a display interface, such as a display serial interface (DSI), a MIPI interface, another type of interface, or a combination thereof.

The shaded block and diagonal right-up facing arrows to the right of the display interface pointer 530 line in FIG. 5 can correspond to transfer of processed partial image frame data from the display buffer to the display and/or display of at least a portion of the processed image by the display. In some examples, a display can display the processed portion(s) of image frame automatically once the processed portion(s) of image frame are received by the display buffer. For example, an organic light emitting diode (OLED) display may be used this way. In some examples, the display can wait to display the processed image frame once all of the processed portions of image frame are received by the display buffer. For example, a liquid crystal display (LCD) display may be used this way.

As indicated above the timeline of FIG. 5, the first half of the display can be populated in approximately 12 milliseconds (ms), from exposure to arrival at the display buffer and/or display. The entire display can be populated in approximately 20.5 ms, from exposure to arrival at the display buffer and/or display. Image processing to be spread out over time, performed in parallel. Dividing the image frame transfer and processing into portions, such as the quarters of FIG. 5, can thus allow processed image portions to arrive at the display buffer and/or at the display more quickly. Dividing the image frame transfer and processing into portions, such as the quarters of FIG. 5, can allow image processing to be spread out over time, giving the image processor dedicated time to process different portions of the image as portions of the image come in, and leaving the image processor with less work at the end of the frame, since earlier portions of the image have already been at least partially processed by that point. Dividing the image frame transfer and processing into portions, such as the quarters of FIG. 5, can allow image processing to be performed at least partially in parallel, for instance allowing the image processor(s) to begin processing the second portion of the image while the first portion of the image is still undergoing processing, and so forth.

Figure 6:
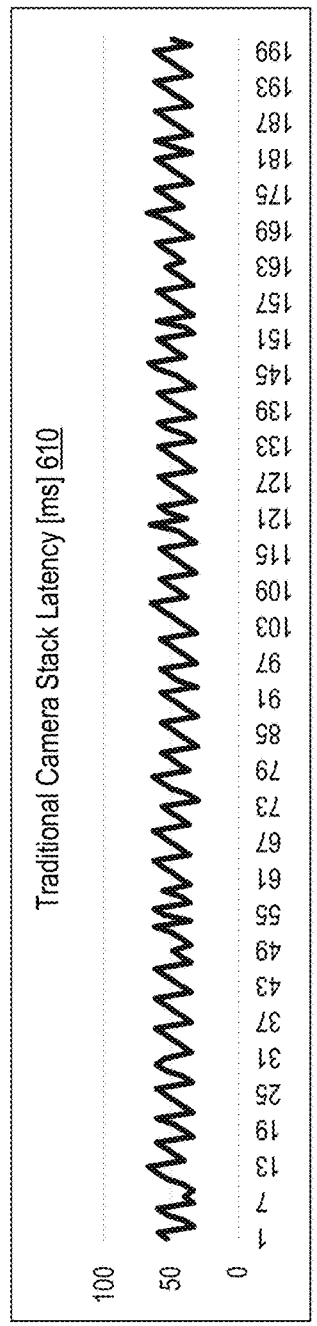
FIG. 6 is a conceptual diagram illustrating reduction in latency between capture and display of image frames according to some examples, in accordance with some examples.
Figure 6:
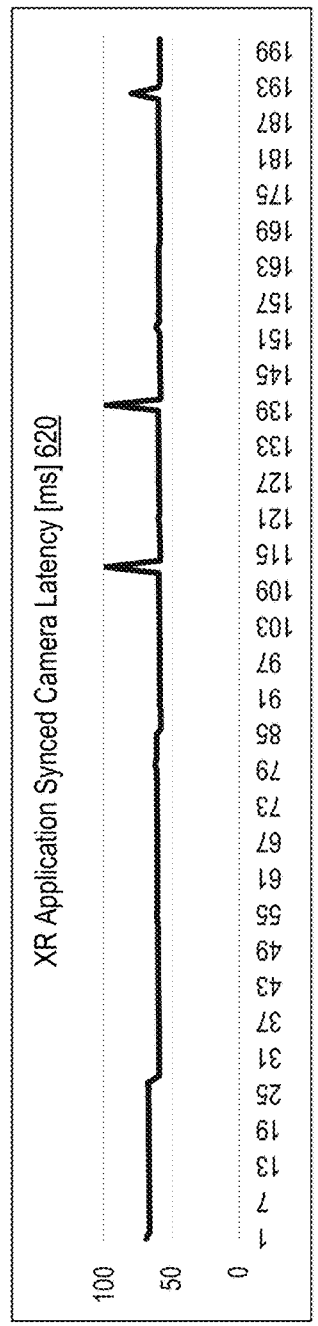
Figure 6:
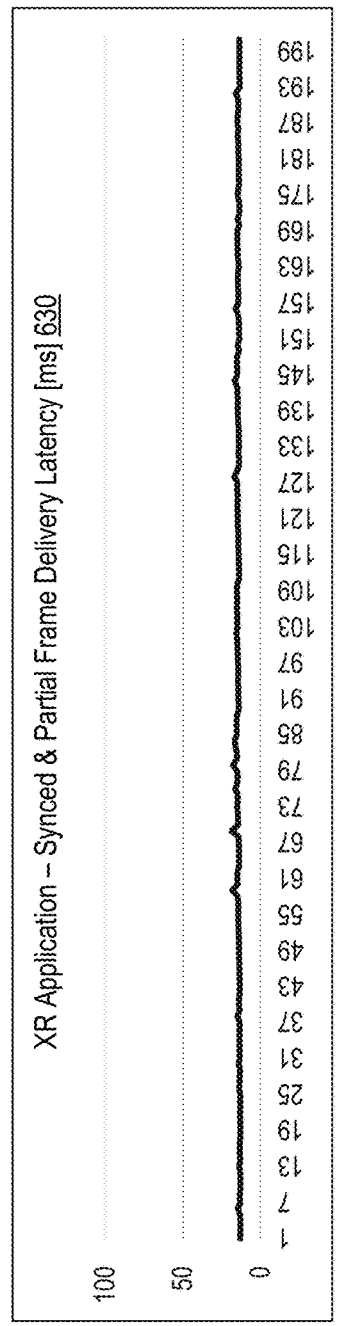

FIG. 6 is a conceptual diagram 600 illustrating reduction in latency between capture and display of image frames according to some examples. The conceptual diagram 600 illustrates three graphs 610, 620, and 630. Each of the graphs has a horizontal axis with frame numbers. Each of the graphs has a horizontal axis with latency in milliseconds. The conceptual diagram 600 includes a first graph 610 illustrating a traditional camera stack latency for a traditional camera stack that does not include the partial image frame transfer techniques described herein (e.g., illustrated in FIG. 3 and FIG. 5), and that does not include synchronization of camera and virtual content latency as described herein with respect to the XR Camera Synchronizer of FIG. 2. In the first graph 610 illustrating the traditional camera stack latency, latency is both high (generally around 50 ms) and has high variability.

The conceptual diagram 600 includes a second graph 620 illustrating an XR application synched camera latency for a camera stack that performs synchronization of camera and virtual content latency as described herein with respect to the XR Camera Synchronizer of FIG. 2. In the second graph 620 illustrating the XR application synched camera latency, latency is high (generally above 50 ms) but has a reduced variability compared to the traditional camera stack latency of the first graph 610.

The conceptual diagram 600 includes a third graph 630 illustrating latency with an XR application that is performs synchronization of camera and virtual content latency as described herein with respect to the XR Camera Synchronizer of FIG. 2 and that uses partial frame delivery as described herein (e.g., illustrated in FIG. 3 and FIG. 5). In the third graph 640 illustrating the latency with the XR application that is synchronized with the camera and that uses partial frame delivery, latency is low (generally around 10-15 ms) and also has low variability.

Figure 7:
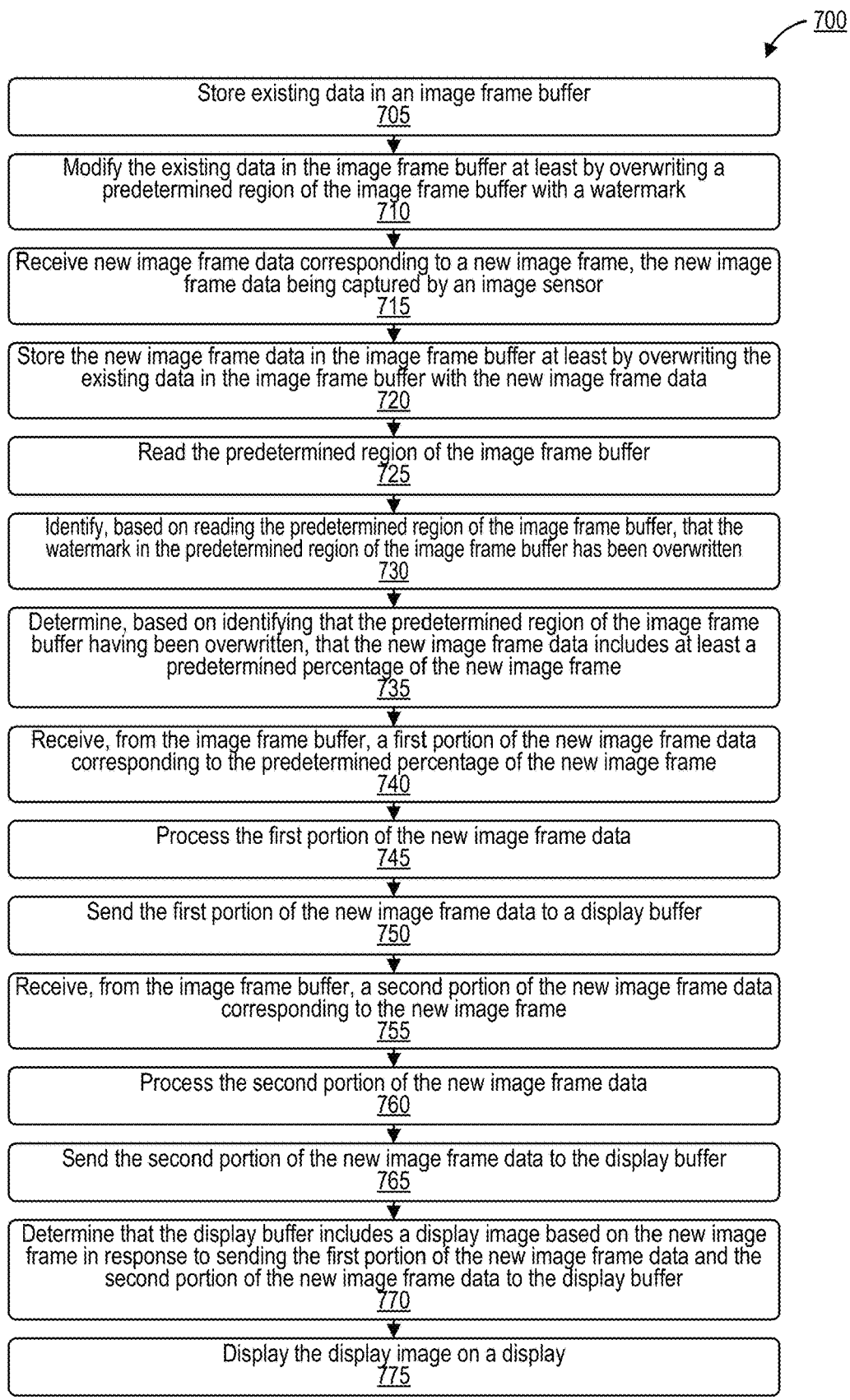
FIG. 7 is a flow diagram illustrating an image capture, processing, and display technique, according to some examples, in accordance with some examples.

In some examples, use of synchronization of camera and virtual content latency as described herein (e.g., with respect to the XR Camera Synchronizer of FIG. 2) and use of partial frame delivery as described herein (e.g., illustrated in FIG. 3 and FIG. 5) can provide significant improvements to latency and consistency. In one illustrative example, average availability of the first ½ frame in a set of frames reduced from 47 ms to 14 ms. In one illustrative example, standard deviation of frame availability reduced from 10 ms to 0.1 ms. In one illustrative example, timing of processing (by compositor 225 in FIG. 2 or "warp" in FIG. 5) (e.g., as determined by latency+2×stdev) is reduced from 67 ms to 14.2 ms FIG. 7 is a flow diagram 700 illustrating an image capture, processing, and display technique, according to some examples. In some examples, the image capture, processing, and display technique illustrated by the flow diagram 700 is performed by an image processing system. In one illustrative example, the image processing system is the XR system 200. In some examples, the image processing system includes at least a portion of an image capture and processing system 100, an image capture device 105A, an image processing device 105B, an XR system 200, an XR application 215, a compositor 225, an imaging system 300, a GPU 325, a system capturing and processing images according to the timeline 500, an imaging system 800, an imaging system 880, an image processing system that performs the operations 900, an image processing system that performs the operations 950, one or more network servers of a cloud service, a computing system 1000, a mobile device, a mobile handset, a wireless communication device, a head-mounted display (HMD), a camera, or a combination thereof.

At operation 705, the image processing system stores existing data in an image frame buffer. At operation 710, the image processing system modifies the existing data in the image frame buffer at least by overwriting a predetermined region of the image frame buffer with a watermark. The watermark may be referred to as metadata.

At operation 715, the image processing system receives new image frame data corresponding to a new image frame, the new image frame data being captured by an image sensor. In some examples, the image processing system may include a connector coupled to the image sensor 130, and the image may be received using the connector. The connector may include a port, a jack, a wire, an input/output (IO) pin, a conductive trace on a printed circuit board (PCB), any other type of connector discussed herein, or some combination thereof. In some examples, the image processing system may include the image sensor 130 that captures the image.

At operation 720, the image processing system stores the new image frame data in the image frame buffer at least by overwriting the existing data in the image frame buffer with the new image frame data. At operation 725, the image processing system reads the predetermined region of the image frame buffer.

At operation 730, the image processing system identifies, based on reading the predetermined region of the image frame buffer, that the watermark in the predetermined region of the image frame buffer has been overwritten. At operation 735, the image processing system determines, based on identifying that the predetermined region of the image frame buffer having been overwritten, that the new image frame data includes at least a predetermined percentage of the new image frame.

At operation 740, the image processing system receives, from the image frame buffer, a first portion of the new image frame data corresponding to the predetermined percentage of the new image frame. At operation 745, the image processing system processes the first portion of the new image frame data. At operation 750, the image processing system sends the first portion of the new image frame data to a display buffer.

At operation 755, the image processing system receives, from the image frame buffer, a second portion of the new image frame data corresponding to the new image frame. In some examples, a second watermark (second metadata) can overwrite a second predetermined region of the existing data in operation 710. In some examples, the image processing system can read a second the predetermined region of the image frame buffer. In some examples, the image processing system can identifies, based on reading the predetermined region of the image frame buffer, that the second watermark in the second predetermined region of the image frame buffer has been overwritten. In some examples, the image processing system can determine, based on identifying that the second predetermined region of the image frame buffer having been overwritten, that the new image frame data includes at least a second predetermined percentage of the new image frame. These operations may occur before operation 755. In some examples, operation 755 may occur once a remainder of the new image frame (other than the first portion of the new image frame data) is received, in which case the second portion of the new image frame data may include the remainder of the new image frame.

At operation 760, the image processing system processes the second portion of the new image frame data. At operation 765, the image processing system sends the second portion of the new image frame data to the display buffer.

At operation 770, the image processing system determines that the display buffer includes a display image based on the new image frame in response to sending the first portion of the new image frame data and the second portion of the new image frame data to the display buffer. At operation 775, the image processing system displays the display image on a display.

Figure 8A:
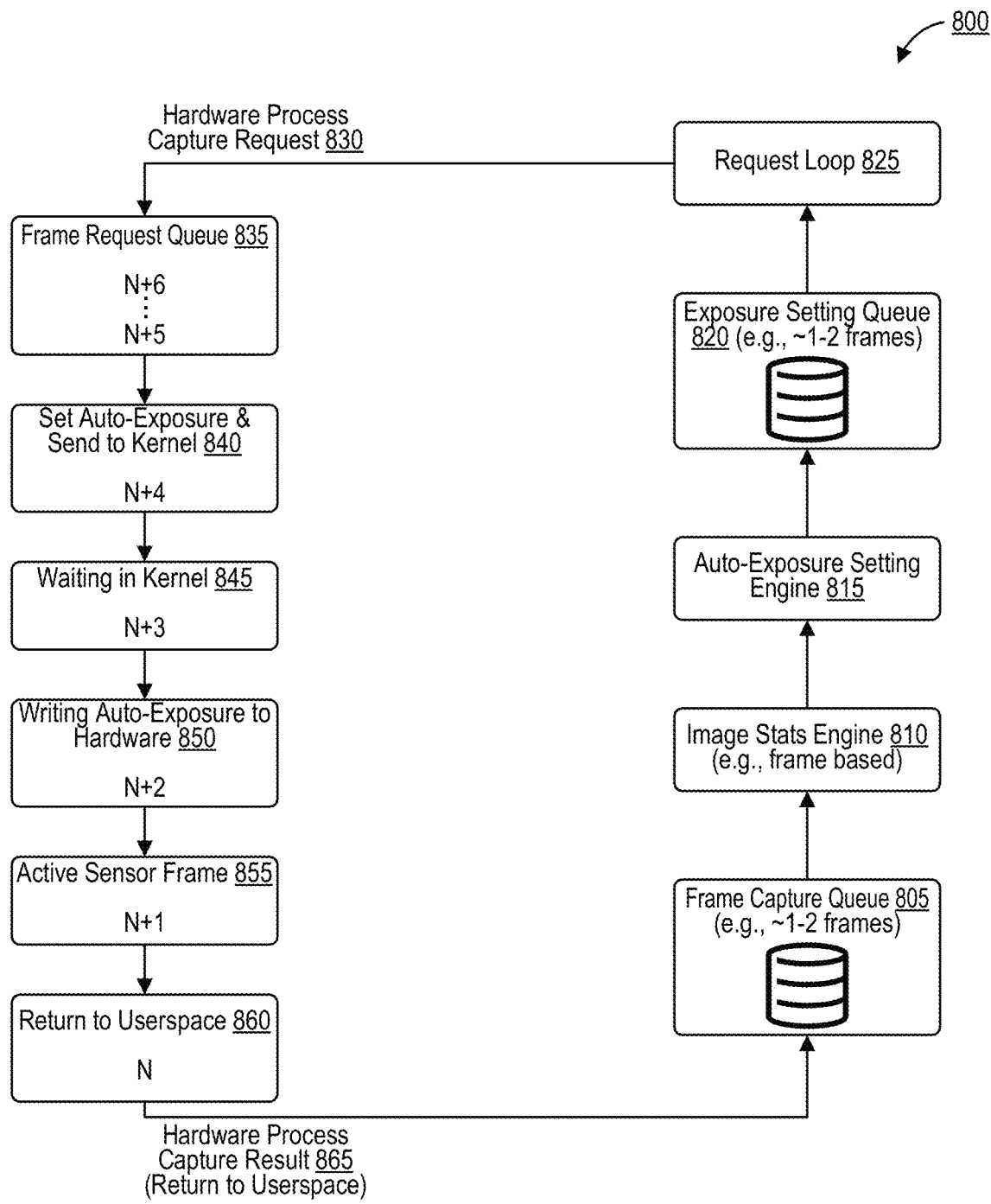
FIG. 8A is a block diagram illustrating an imaging system for auto-exposure, in accordance with some examples.

FIG. 8A is a block diagram illustrating an imaging system 800 for auto-exposure, in accordance with some examples. Auto-exposure systems automatically adjust exposure settings for an image sensor 130 and/or control mechanisms 120 for capturing one or more images, generally based on ambient lighting (e.g., determined based on previous images captured by the same image sensor 130 and/or control mechanisms 120). Auto-exposure systems automatically adjust exposure settings using hardware, software, or a combination thereof. Auto-exposure systems can add latency to imaging systems while automatically adjusting exposure settings. In certain applications, such as extended reality (XR), latency added by auto-exposure systems can degrade performance, for instance by desynchronizing the view that an XR device displays to the user the view the user should have based on the pose of the XR device and/or the user. Latency can have a particularly performance-degrading effect when combined with demanding features such as six degrees of freedom (6DOF) and/or video pass-through (VPT).

In some examples, auto-exposure systems that automatically adjust exposure settings using hardware can add less latency (e.g., 2-3 frames) than auto-exposure systems that automatically adjust exposure settings using software (e.g., 8-10 frames). However, some imaging systems may nonetheless automatically adjust exposure settings using software, for instance due to restrictions imposed by hardware setups, operating systems, and/or software applications that the imaging systems operate within or in collaboration with.

The imaging system 800 includes a frame capture queue 805, which may include one or more image frames captured by an image sensor 130. The imaging system 800 includes an image statistics engine 810 that can determine (e.g., calculate), in hardware and/or in software, one or more image statistics for the one or more image frames in the frame capture queue 805. The one or more image statistics can include one or more average brightness levels in the image frame(s) in the frame capture queue 805, one or more ambient brightness levels in the image frame(s) in the frame capture queue 805, one or more average luminosity levels in the image frame(s) in the frame capture queue 805, one or more minimum brightness levels in the image frame(s) in the frame capture queue 805, one or more minimum luminosity levels in the image frame(s) in the frame capture queue 805, one or more maximum brightness levels in the image frame(s) in the frame capture queue 805, one or more maximum luminosity levels in the image frame(s) in the frame capture queue 805, one or more brightness curves for the image frame(s) in the frame capture queue 805, one or more luminosity curves for the image frame(s) in the frame capture queue 805, or a combination thereof. In some examples, the image frames can be in the frame capture queue 805 for a period of time before the image statistics engine receives and/or determines the image statistics for the image frames. In some examples, the image sensor 130 can captures one or more image frames (e.g., 1-2 frames) during the period of time. In some examples, the period of time can contribute to auto-exposure latency.

The imaging system 800 includes an auto-exposure setting engine 815 that can determine (e.g., calculate) an exposure setting for the image sensor 130 and/or control mechanisms 120 based on the one or more image statistics determined by the image statistics engine 810. For example, if the image statistics determined by the image statistics engine 810 indicate that the images in the frame capture queue 805 are very dim or dark, then the auto-exposure setting engine 815 may increase exposure for the exposure setting, for instance by increasing exposure time, reducing shutter speed, increasing aperture size, and/or increasing ISO. If the image statistics determined by the image statistics engine 810 indicate that the images in the frame capture queue 805 are very bright or luminous, then the auto-exposure setting engine 815 may decrease exposure for the exposure setting, for instance by decreasing exposure time, increasing shutter speed, decreasing aperture size, and/or decreasing ISO. If the image statistics determined by the image statistics engine 810 indicate that the images in the frame capture queue 805 are well-exposed, then the auto-exposure setting engine 815 may maintain a previously-set exposure setting as-is.

The imaging system 800 includes an exposure setting queue 820. The exposure setting queue 820 can include settings to be applied to image frames to be captured by the image sensor 130, such as the exposure setting determined by the auto-exposure setting engine 815. The exposure setting queue 820 can hold the settings before the settings are applied in hardware to the image sensor 130 and/or control mechanisms 120 through a request loop 825. The exposure setting queue 820 can be referred to as an exposure setting buffer, a setting queue, a setting buffer, or some combination thereof. In some examples, the settings, including the exposure setting determined by the auto-exposure setting engine 815, can be in the exposure setting queue 820 for a period of time. In some examples, the image sensor 130 can capture one or more image frames (e.g., 1-2 frames) during the period of time. In some examples, the period of time can contribute to auto-exposure latency.

The request loop 825 can submit requests, including a hardware process capture request 830, to capture hardware, such as the image sensor 130, the control mechanisms 120, and/or other elements of the image capture device 105A. The hardware, represented on the left-hand side of FIG. 8A by the blocks 835-860 between the hardware process capture request 830 and the hardware process capture result 865, requests capture of a sequence of image frames. The frame requests for each of the sequence of image frames are identified as frame request N, frame request N+1, frame request N+2, frame request N+3, frame request N+4, frame request N+5, and request frame N+6. The hardware process can ultimately capture image frames corresponding to the frame requests, such as an image frame N corresponding to the frame request N, an image frame N+1 corresponding to the frame request N+1, an image frame N+2 corresponding to the frame request N+2, an image frame N+3 corresponding to the frame request N+3, an image frame N+4 corresponding to the frame request N+4, an image frame N+5 corresponding to the frame request N+5, and/or an image frame N+6 corresponding to the frame request N+6.

In an illustrative example, image frames N+6 and N+5 can be enqueued in a frame request queue 835. The frame request queue 835 may be referred to as a frame request queue, frame capture request queue, capture request queue, request queue, frame queue, capture queue, frame request buffer, frame capture request buffer, capture request buffer, request buffer, frame buffer, capture queue, or combination thereof. Frame requests (e.g., frame requests N+6 and N+5) can include the auto-exposure setting determined by the auto-exposure setting engine 815. Each of the frame requests (e.g., frame requests N+6 and N+5) can be automatically enqueued in the frame request queue once a slot is available in the frame request queue 835. Each of the frame requests N, N+1, N+2, N+3, N+4, N+5, and N+6 either are currently in the frame request queue 835 or were previously in the frame request queue 835 as of the moment in time illustrated in FIG. 8A.

The capture hardware reads frame request N+4 and obtains the exposure setting determined by the auto-exposure setting engine 815. The capture hardware sets the exposure setting to be used and sends the exposure setting to the kernel 840. While the capture hardware reads frame request N+3, the exposure setting determined by the auto-exposure setting engine 815 and sent to the kernel (operation 840) is waiting in the kernel 845. While the capture hardware reads frame request N+2, the exposure setting determined by the auto-exposure setting engine 815 is being written to hardware 850, for instance at the control mechanisms 120. The frame request N+1 is identified as the active sensor frame 855, indicating that the capture hardware is capturing the image frame N+1 corresponding to the frame request N+1, and that the capture hardware applies the exposure setting determined by the auto-exposure setting engine 815 for the capture of the image frame N+1 (e.g., at or prior to the capture of the image frame N+1). Frame request N has, at the time illustrated in FIGS. 8A-8B, already been captured. The capture hardware sends the frame request N to the frame capture queue 805. The capture hardware can begin the return to userspace from kernel space at operation 860. The transition from kernel space to userspace can take some time. Operation 860 can also include metadata handling for frame N+1 and/or pack data structures to return to userspace as part of the hardware process capture result 865. The hardware sends the hardware process capture result 865 to the software process represented on the right-hand side of FIG. 8A by blocks 805-825. In some examples, the software process can be executed in user space rather than kernel space. The hardware process capture result 865 can include one or more of the image frames N through N+6 to be stored in the frame queue 805.

Figure 8B:
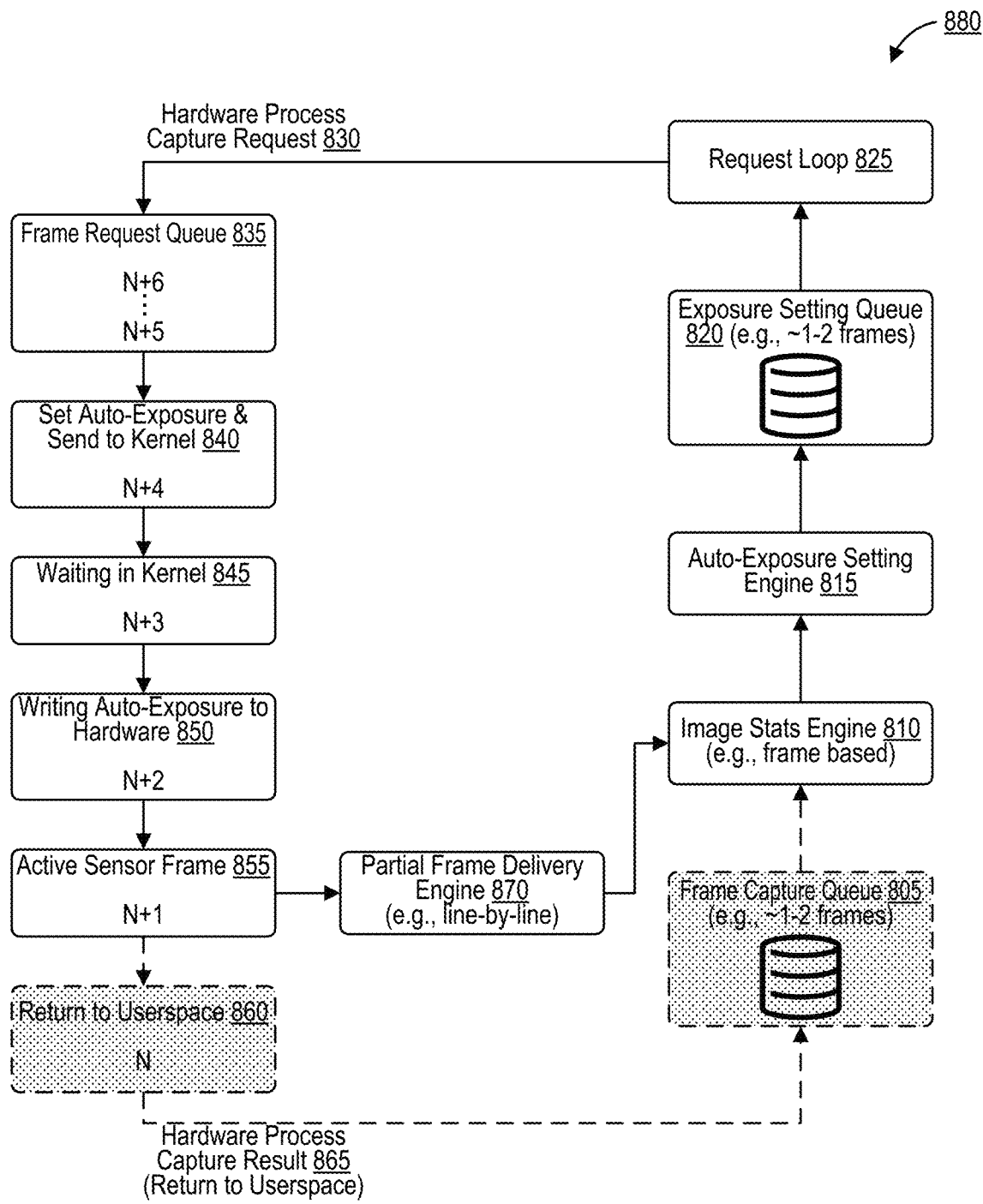
FIG. 8B is a block diagram illustrating an imaging system for auto-exposure with partial frame delivery, in accordance with some examples.

FIG. 8B is a block diagram illustrating an imaging system 880 for auto-exposure with partial frame delivery, in accordance with some examples. The imaging system 880 includes the components and operations of the imaging system 800, but speeds up the auto-exposure process using a partial frame delivery engine 870.

The partial frame delivery engine 870 can deliver portions of the active sensor frame 855 (image frame N+1) directly to the image statistics engine 810. Portions of the active sensor frame 855 (image frame N+1) are sent to the image statistics engine 810 as in FIG. 2, FIG. 3, FIG. 4, FIG. 5, FIG. 7, FIG. 9A, and/or FIG. 9B. For instance, the partial frame delivery engine 870 can add watermarks 320 or other markings into an image buffer into which image data from frame the active sensor frame 855 (image frame N+1) is to be written. The partial frame delivery engine 870 retrieves partial frame data for the active sensor frame 855 (image frame N+1), representing portions of the active sensor frame 855 (image frame N+1), when certain watermarks 320 or markings are overwritten with image data from the active sensor frame 855 (image frame N+1). The partial frame delivery engine 870 sends the partial frame data for the active sensor frame 855 (image frame N+1) to the image statistics engine 810, which can begin determining the image statistics for the active sensor frame 855 (image frame N+1), frame portion by frame portion. In some examples, the partial frame delivery engine 870 retrieve image data line by line from the active sensor frame 855 (image frame N+1), and send the lines to the image statistics engine 810. In some examples, each partial frame includes one or more lines of the active sensor frame 855 (image frame N+1).

The imaging system 880 is able to speed up the auto-exposure process by bypassing certain operations, whose corresponding blocks in FIG. 8B are illustrated shaded and outlined with dashed lines, and whose corresponding arrows in FIG. 8B are illustrated with dashed lines. For instance, the imaging system 880 is able to speed up the auto-exposure process by bypassing the begin software process 860 and the frame capture queue 805. Speeding up the auto-exposure process can reduce latency in the auto-exposure process. Reducing latency in the auto-exposure process can improve performance, for instance for XR systems. For example, reducing latency in the auto-exposure process can help to synchronize the view that an XR device displays to the user the view the user should have based on the pose of the XR device and/or the user. Reducing latency in the auto-exposure process can make demanding features such as six degrees of freedom (6DOF) and/or video pass-through (VPT) work more smoothly and more consistently.

While the imaging system 800 of FIG. 8A and the imaging system 880 of FIG. 8B perform auto-exposure, similar procedures can be used for auto-focus, auto-zoom, automatic gain adjustment, automatic brightness adjustment, automatic contrast adjustment, automatic tone mapping, automatic sharpness adjustment, automatic color saturation adjustment, and/or other automatic image processing operations based on the image statistics.

Figure 9A:
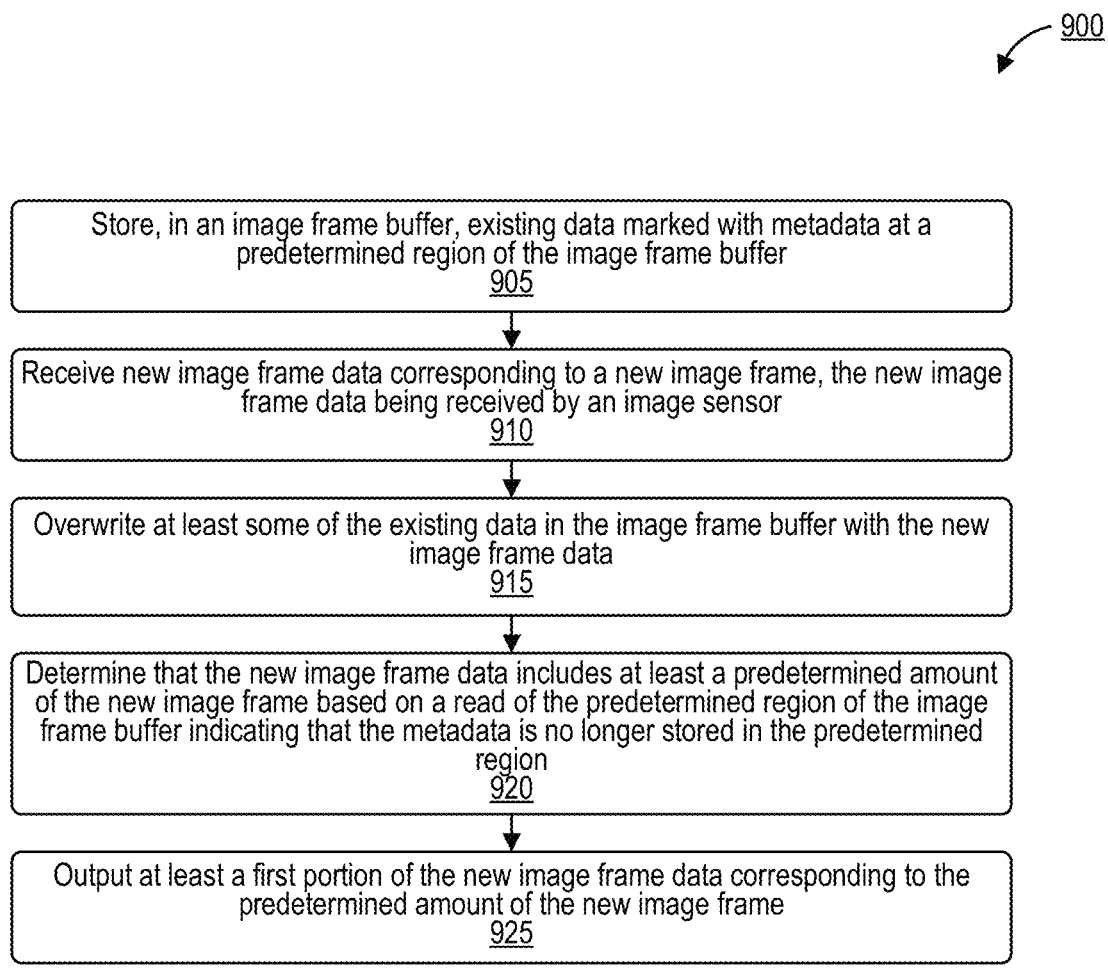
FIG. 9A is a flow diagram illustrating an image processing technique, in accordance with some examples.

FIG. 9A is a flow diagram 900 illustrating an image processing technique, according to some examples. In some examples, the image processing technique illustrated by the flow diagram 900 is performed by an image processing system. In one illustrative example, the image processing system is the XR system 200. In some examples, the image processing system includes at least a portion of an image capture and processing system 100, an image capture device 105A, an image processing device 105B, an XR system 200, an XR application 215, a compositor 225, an imaging system 300, a GPU 325, a system capturing and processing images according to the timeline 500, an image processing system that performs the operations 700, an imaging system 800, an imaging system 880, an image processing system that performs the operations 950, one or more network servers of a cloud service, a computing system 1000, a mobile device, a mobile handset, a wireless communication device, a head-mounted display (HMD), a camera, or a combination thereof.

At operation 905, the image processing system stores, in an image frame buffer, existing data marked with metadata at a predetermined region of the image frame buffer. The metadata of operation 905 may be, or may include, a watermark. The watermarks 320, watermarks 430, and watermarks 435 may be examples of the metadata of operation 905. The watermarks 320, watermarks 430, and watermarks 435 may be examples of the watermark included in the metadata of operation 905. The operation 905 may correspond to at least a subset of the operations 705-710 of FIG. 7. The image processing system may include the image frame buffer. The image processing system may include an image buffer that includes one or more image frame buffers, such as the image buffer(s) 210 and/or image buffer 310. The image buffer(s) 210 and/or image buffer 310 may include the image frame buffer of operation 905. The image frame buffer 315 of FIG. 3 may be an example of the image frame buffer of operation 905. The unshaded white area at the bottom of the image frame buffer 315 of FIG. 3 may be an example of the existing data of operation 905. The existing image frame buffer data 450 and existing image frame buffer data 455 of FIG. 4 may be examples of the existing data of operation 905. The metadata of operation 905 can include a pattern of colors, a frame identifier associated with the new image frame, an image frame buffer identifier associated with the image frame buffer, or a combination thereof. The metadata of operation 905 can include any patterns or information discussed as herein as possible to include in any of the watermarks 320, watermarks 430, and watermarks 435.

In some examples, before operation 905, the image processing system modifies the existing data to mark the existing data with the metadata at the predetermined region of the image frame buffer. For instance, the existing data may previously not be marked with the metadata at the predetermined region, and the image processing system may insert the metadata at the predetermined region and/or overwrite a portion of the existing data at the predetermined region. For instance, the image processing system may have inserted the watermarks 430 into the existing image frame buffer data 450 of FIG. 4, and/or inserted the watermarks 435 into the existing image frame buffer data 455 of FIG. 4.

In some examples, the existing data is prior image frame data from a prior image frame that was captured before capture of the new image frame. For example, the existing image frame buffer data 450 and the existing image frame buffer data 455 of FIG. 4 include image data depicting a room with a chandelier. Similarly, the new image frame data 420 and the new image frame data 425 of FIG. 4 appear to include image data depicting the same room with the same chandelier, captured from a slightly different position (e.g., see differences between the existing image frame buffer data 450 and the new image frame data 420 along the seam 440, and differences between the existing image frame buffer data 455 and the new image frame data 425 along the seam 445). The prior image frame and the new image frame can be two different image frames in the same video, with the prior image frame appearing earlier in the video than the new image frame, and the new image frame appearing later in the video than the prior image frame At operation 910, the image processing system receives new image frame data corresponding to a new image frame, the new image frame data being received by an image sensor. The new image frame data being received by the image sensor may include the new image frame data being captured by the image sensor. In some examples, the image processing system may include a connector coupled to the image sensor 130, and the image may be received using the connector. The connector may include a port, a jack, a wire, an input/output (IO) pin, a conductive trace on a printed circuit board (PCB), any other type of connector discussed herein, or some combination thereof. In some examples, the image processing system may include the image sensor 130 that captures the image. The operation 910 may correspond to the operation 715 of FIG. 7. The shaded dithered area of the image frame buffer 315 of FIG. 3 may be an example of the new image frame data of operation 910. The new image frame data 420 and new image frame data 425 of FIG. 4 may be examples of the new image frame data of operation 910. The data in the "Cam" blocks of FIG. 5 may be an example of the new image frame data of operation 910.

At operation 915, the image processing system overwrites at least some of the existing data in the image frame buffer with the new image frame data. The operation 915 may correspond to the operation 720 of FIG. 7. Operation 915 may include storing the new image frame data in the image frame buffer.

At operation 920, the image processing system determines that the new image frame data includes at least a predetermined amount of the new image frame based on a read of the predetermined region of the image frame buffer indicating that the metadata is no longer stored in the predetermined region. The operation 920 may correspond to at least a subset of the operations 725-735 of FIG. 7. In some examples, to determine that the new image frame data includes at least a predetermined amount of the new image frame, the image processing system reads the predetermined region of the image frame buffer and identifies, based on reading the predetermined region of the image frame buffer, that the metadata in the predetermined region of the image frame buffer has been overwritten. The memory read in FIG. 3 indicated by the dashed arrow from the GPU 325 to one of the watermarks 320 in the image frame buffer 315 of FIG. 3 is an example of a memory read that may be a basis for the determination of operation 920. A memory read of a region above the seam 440 in the left image frame buffer 410 may be an example of a memory read that may be a basis for the determination of operation 920. A memory read of a region above the seam 445 in the right image frame buffer 415 may be an example of a memory read that may be a basis for the determination of operation 920.

The predetermined amount of the new image frame can includes a predetermined percentage of the new image frame, a predetermined fraction of the new image frame, a predetermined number of rows of the new image frame, a predetermined percentage of the rows of the new image frame, a predetermined fraction of the rows of the new image frame, a predetermined number of columns of the new image frame, a predetermined percentage of the columns of the new image frame, a predetermined fraction of the columns of the new image frame, a predetermined number of pixels of the new image frame, a predetermined percentage of the pixels of the new image frame, a predetermined fraction of the pixels of the new image frame, or a combination thereof.

At operation 925, the image processing system outputs at least a first portion of the new image frame data corresponding to the predetermined amount of the new image frame. Outputting the first portion of the new image frame data can include sending the first portion of the new image frame data to an application (e.g., XR application 215), processing the new image frame data using an application (e.g., XR application 215), compositing the new image frame data with virtual data (e.g., using the compositor 225), sending the first portion of the new image frame data to a display buffer (e.g., display buffer 230, display buffer 330, DSI read pointer of FIG. 5), displaying the first portion of the new image frame data using a display (e.g., display 235, display 335, DSI read pointer of FIG. 5), sending the first portion of the new image frame data to another device, or a combination thereof. The operation 920 may correspond to at least a subset of the operations 740-775 of FIG. 7.

In some examples, to output the first portion of the new image frame data as in operation 925, the image processing system is configured to, and can, send the first portion of the new image frame data to an extended reality (XR) application (e.g., the XR application 215 of FIG. 2) and/or another type of application. In some examples, to output the first portion of the new image frame data as in operation 925, the image processing system is configured to, and can, process the first portion of the new image frame data using an extended reality (XR) application (e.g., the XR application 215 of FIG. 2) and/or another type of application. In some examples, to output the first portion of the new image frame data as in operation 925, the image processing system is configured to, and can, composite the first portion of the new image frame data with virtual content (e.g., virtual content from the virtual content render buffers 220 of FIG. 2). In some examples, to output the first portion of the new image frame data as in operation 925, the image processing system is configured to, and can, warp, distort, and/or perform distortion correction on at least some of the first portion of the new image frame data.

In some examples, to output the first portion of the new image frame data as in operation 925, the one or more processors store the first portion of the new image frame data in a display buffer. In some examples, the image processing system includes the display buffer. Examples of the display buffer include the I/O 156 of FIG. 1, the I/O 160 of FIG. 1, display buffer 230 of FIG. 2, the display buffer 330 of FIG. 3, the DSI read pointer indicator of FIG. 5, output devices 1035 of FIG. 10, or combinations thereof.

In some examples, to output the first portion of the new image frame data as in operation 925, the one or more processors display the first portion of the new image frame data using a display. In some examples, the image processing system includes the display. Examples of the display include the I/O 156 of FIG. 1, the I/O 160 of FIG. 1, display 235 of FIG. 2, the display 335 of FIG. 3, the DSI read pointer indicator of FIG. 5, and output devices 1035 of FIG. 10, or combinations thereof.

In some examples, to output the first portion of the new image frame data as in operation 925, the one or more processors send the first portion of the new image frame data to a device. The device may be an external device. The device may be a remote computing device, such as a remote server for storing image data and/or serving the stored image data. The device may be a display device, such as a display screen, a projector, a printer, or another type of display device. The device may be a computing system 1000. In some examples, to output at least the first portion of the new image frame data, the image processing system is configured to, and can, output the new image frame. For instance, if the predetermined region of the image frame buffer is at the end of the image frame buffer (or otherwise where the end of the new image frame is expected to be), then operation 920 may indicate that the entirety of the new image frame has been received, and can be output at operation 925.

In some examples, the existing data is marked with second metadata at a second predetermined region of the image frame buffer. The second metadata may be a second watermark, and may include any types of data discussed as included in the metadata and/or watermarks with respect to operation 905. In some examples, the image processing system can determine that the new image frame data includes at least a second predetermined amount of the new image frame based on a second read of the second predetermined region of the image frame buffer indicating that the second metadata is no longer stored in the second predetermined region. Any details discussed herein regarding operation 920 may apply to determining that the new image frame data includes at least the second predetermined amount of the new image frame. Determining that the new image frame data includes at least the second predetermined amount of the new image frame may correspond to operation 755 of FIG. 7. In some examples, the image processing system can output at least a second portion of the new image frame data corresponding to the second predetermined amount of the new image frame. Any details discussed herein regarding operation 925 may apply to outputting at least the second portion of the new image frame data. Outputting at least the second portion of the new image frame data may correspond to any of operations 755-775 of FIG. 7.

Figure 9B:
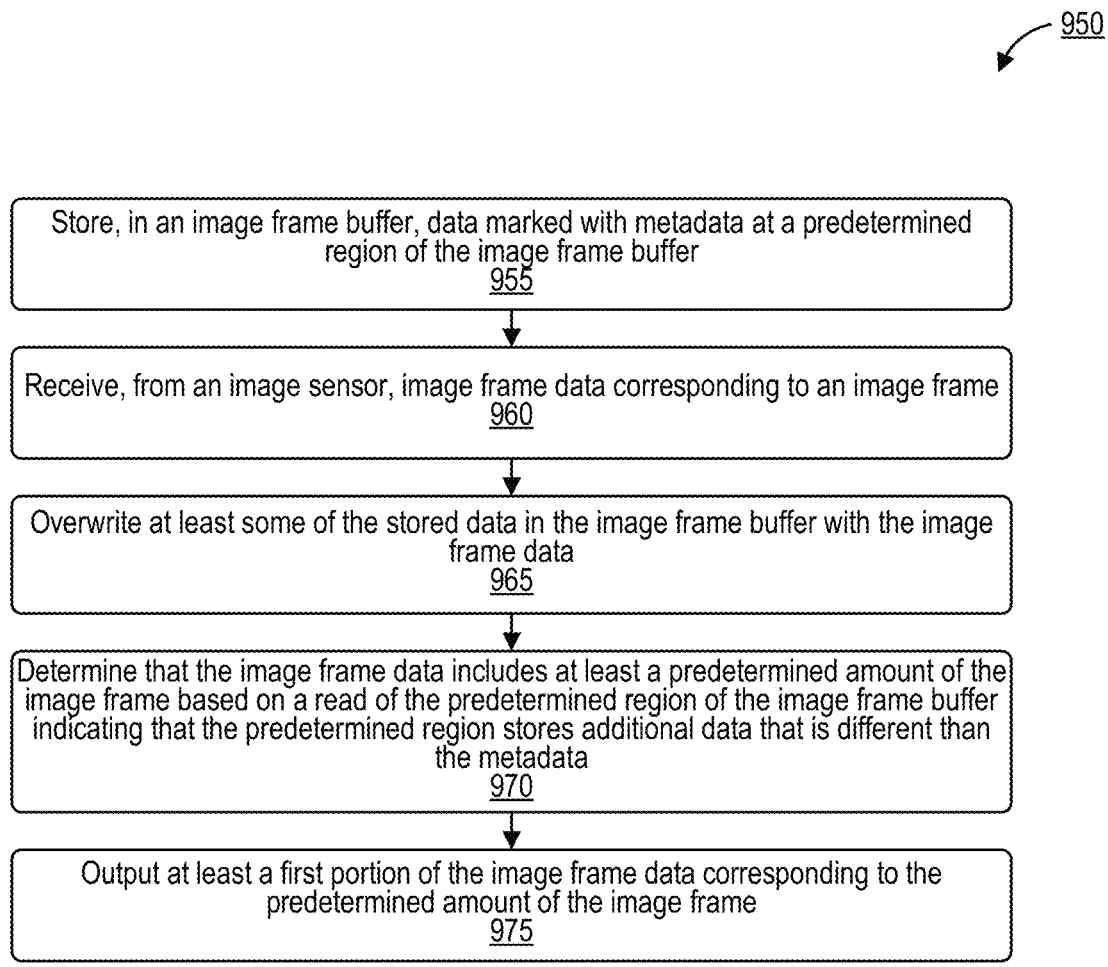
FIG. 9B is a flow diagram illustrating an image processing technique, in accordance with some examples.

FIG. 9B is a flow diagram 900 illustrating an image processing technique, according to some examples. In some examples, the image processing technique illustrated by the flow diagram 900 is performed by an image processing system. In one illustrative example, the image processing system is the XR system 200. In some examples, the image processing system includes at least a portion of an image capture and processing system 100, an image capture device 105A, an image processing device 105B, an XR system 200, an XR application 215, a compositor 225, an imaging system 300, a GPU 325, a system capturing and processing images according to the timeline 500, an image processing system that performs the operations 700, an imaging system 800, an imaging system 880, one or more network servers of a cloud service, the image processing system that performs the operations 900, a computing system 1000, a mobile device, a mobile handset, a wireless communication device, a head-mounted display (HMD), a camera, or a combination thereof.

At operation 955, the image processing system stores, in an image frame buffer, data marked with metadata at a predetermined region of the image frame buffer. The data stored in the image frame buffer in operation 955 may be referred to as stored data, or as existing data (as in operation 905 of FIG. 9A or operations 705-710 of FIG. 7). The operation 955 may correspond to the operation 905 of FIG. 9A, the operation 705 of FIG. 7, and/or the operation 710 of FIG. 7. The metadata may be, and/or may include, one or more watermarks. Examples of the metadata may include the watermarks 320, watermarks 430, and watermarks 435. Examples of one or more watermarks included in the metadata of operation 955 include the watermarks 320, watermarks 430, and watermarks 435.

The image processing system may include the image frame buffer. The image processing system may include an image buffer that includes one or more image frame buffers, such as the image buffer(s) 210 and/or image buffer 310. The image buffer(s) 210 and/or image buffer 310 may include the image frame buffer of operation 955. The image frame buffer 315 of FIG. 3 may be an example of the image frame buffer of operation 955. The unshaded white area at the bottom of the image frame buffer 315 of FIG. 3 may be an example of the stored data of operation 955. Examples of the stored data may include the existing image frame buffer data 450 and existing image frame buffer data 455 of FIG. 4. The metadata of operation 955 can include a pattern of colors, a frame identifier associated with the image frame, an image frame buffer identifier associated with the image frame buffer, or a combination thereof. The metadata of operation 955 can include any patterns or information discussed as herein as possible to include in any of the watermarks 320, watermarks 430, and watermarks 435.

In some examples, before operation 955, the image processing system modifies the stored data to mark the stored data with the metadata at the predetermined region of the image frame buffer. For instance, the stored data may previously not be marked with the metadata at the predetermined region, and the image processing system may insert the metadata at the predetermined region and/or overwrite a portion of the stored data at the predetermined region. For instance, the image processing system may have inserted the watermarks 430 into the existing image frame buffer data 450 of FIG. 4, and/or inserted the watermarks 435 into the existing image frame buffer data 455 of FIG. 4, and/or inserted the watermarks 320 into stored data in the image frame buffer 315 of FIG. 3.

At operation 960, the image processing system receives, from an image sensor, image frame data corresponding to an image frame. The operation 960 may correspond to the operation 910 of FIG. 9A and/or the operation 715 of FIG. 7. The image frame data being received by the image sensor may include the image frame data being captured by the image sensor. In some examples, the image processing system may include a connector coupled to the image sensor 130, and the image may be received using the connector. The connector may include a port, a jack, a wire, an input/output (IO) pin, a conductive trace on a printed circuit board (PCB), any other type of connector discussed herein, or some combination thereof. In some examples, the image processing system may include the image sensor 130 that captures the image. The shaded dithered area of the image frame buffer 315 of FIG. 3 may be an example of the image frame data of operation 960. The image frame data 420 and image frame data 425 of FIG. 4 may be examples of the image frame data of operation 960. The data in the "Cam" blocks of FIG. 5 may be an example of the image frame data of operation 960.

In some examples, the stored data is (and/or includes) prior image frame data from a prior image frame that was captured (by the image sensor or by a different second image sensor) and/or before capture and/or storage of the image frame of operation 960. For example, the existing image frame buffer data 450 and the existing image frame buffer data 455 of FIG. 4 include image data depicting a room with a chandelier. Similarly, the image frame data 420 and the image frame data 425 of FIG. 4 appear to include image data depicting the same room with the same chandelier, captured from a slightly different position (e.g., see differences between the existing image frame buffer data 450 and the image frame data 420 along the seam 440, and differences between the existing image frame buffer data 455 and the image frame data 425 along the seam 445). The prior image frame and the image frame can be two different image frames in the same video, with the prior image frame appearing earlier in the video than the image frame, and the image frame appearing later in the video than the prior image frame In some examples, the image processing system receives a request for a view of a scene before operation 960. In response to receipt of the request, the image processing system can automatically expose the image sensor to light from the scene, for instance by opening an aperture. The image frame data received from the image sensor in operation 960 can be based on the exposure of the image sensor to the light from the scene. For instance, an XR device, such as a HMD, can request pass-through imagery of the scene in front of the XR device at certain times (e.g., when requested by the user of the XR device or when needed to show the user of the XR device the scene or something that is based on the scene), but may not always need pass-through imagery of the scene.

At operation 965, the image processing system overwrites at least some of the stored data in the image frame buffer with the image frame data. The operation 965 may correspond to the operation 915 of FIG. 9A and/or the operation 720 of FIG. 7. As part of operation 965, the image processing system may store the image frame data in the image frame buffer. Operation 965 may include storing the image frame data in the image frame buffer.

At operation 970, the image processing system determines that the image frame data includes at least a predetermined amount of the image frame based on a read of the predetermined region of the image frame buffer indicating that the predetermined region stores additional data than is different than the metadata. The operation 970 may correspond to the operation 920 of FIG. 9A, the operation 725 of FIG. 7, the operation 730 of FIG. 7, and/or the operation 735 of FIG. 7. In some examples, the additional data is (and/or includes) at least a portion of the image frame data of operation 965. The additional data can be referred to as alternate data, new data, new image data, secondary data, different data, distinct data, data, information, or another type of data.

As part of operation 970, the image processing system can read the predetermined region of the image frame buffer, which may be referred to as the "read" in operation 970. The image processing system can determine, based on the read of the predetermined region of the image frame buffer, that the predetermined region stores the additional data than is different than the metadata. The image processing system can identify, based on reading the predetermined region of the image frame buffer, that the metadata in the predetermined region of the image frame buffer has been overwritten (e.g., with the additional data and/or at least a portion of the image frame data of operation 965), for instance because the metadata is no longer found at the predetermined region of the image frame buffer. The memory read in FIG. 3 indicated by the dashed arrow from the GPU 325 to one of the watermarks 320 in the image frame buffer 315 of FIG. 3 is an example of a memory read that may be a basis for the determination of operation 970. A memory read of a region above the seam 440 in the left image frame buffer 410 may be an example of a memory read that may be a basis for the determination of operation 970. A memory read of a region above the seam 445 in the right image frame buffer 415 may be an example of a memory read that may be a basis for the determination of operation 970.

The predetermined amount of the image frame can includes a predetermined percentage of the image frame, a predetermined fraction of the image frame, a predetermined number of rows of the image frame, a predetermined percentage of the rows of the image frame, a predetermined fraction of the rows of the image frame, a predetermined number of columns of the image frame, a predetermined percentage of the columns of the image frame, a predetermined fraction of the columns of the image frame, a predetermined number of pixels of the image frame, a predetermined percentage of the pixels of the image frame, a predetermined fraction of the pixels of the image frame, or a combination thereof.

At operation 975, the image processing system outputs at least a first portion of the image frame data corresponding to the predetermined amount of the image frame. The operation 975 may correspond to the operation 925 of FIG. 9A, the operation 740 of FIG. 7, the operation 745 of FIG. 7, the operation 750 of FIG. 7, the operation 755 of FIG. 7, the operation 760 of FIG. 7, the operation 765 of FIG. 7, the operation 770 of FIG. 7, and/or the operation 775 of FIG. 7.

Outputting the first portion of the image frame data can include sending the first portion of the image frame data to an application (e.g., XR application 215), processing the image frame data using an application (e.g., XR application 215), compositing the image frame data with virtual data (e.g., using the compositor 225), sending the first portion of the image frame data to a display buffer (e.g., display buffer 230, display buffer 330, DSI read pointer of FIG. 5), displaying the first portion of the image frame data using a display (e.g., display 235, display 335, DSI read pointer of FIG. 5), sending the first portion of the image frame data to another device, or a combination thereof.

In some examples, to output the first portion of the image frame data as in operation 975, the image processing system is configured to, and can, send the first portion of the image frame data to an extended reality (XR) application (e.g., the XR application 215 of FIG. 2) and/or another type of application. In some examples, to output the first portion of the image frame data as in operation 975, the image processing system is configured to, and can, process the first portion of the image frame data using an extended reality (XR) application (e.g., the XR application 215 of FIG. 2) and/or another type of application. In some examples, to output the first portion of the image frame data as in operation 975, the image processing system is configured to, and can, composite the first portion of the image frame data with virtual content (e.g., virtual content from the virtual content render buffers 220 of FIG. 2). In some examples, to output the first portion of the image frame data as in operation 975, the image processing system is configured to, and can, warp, distort, and/or perform distortion correction on at least some of the first portion of the image frame data.

In some examples, to output the first portion of the image frame data as in operation 975, the image processing system stores the first portion of the image frame data in a display buffer. In some examples, the image processing system includes the display buffer. Examples of the display buffer include the I/O 156 of FIG. 1, the I/O 160 of FIG. 1, display buffer 230 of FIG. 2, the display buffer 330 of FIG. 3, the DSI read pointer indicator of FIG. 5, output devices 1035 of FIG. 10, or combinations thereof.

In some examples, to output the first portion of the image frame data as in operation 975, the image processing system displays the first portion of the image frame data using a display. In some examples, the image processing system includes the display. Examples of the display include the I/O 156 of FIG. 1, the I/O 160 of FIG. 1, display 235 of FIG. 2, the display 335 of FIG. 3, the DSI read pointer indicator of FIG. 5, and output devices 1035 of FIG. 10, or combinations thereof.

In some examples, to output the first portion of the image frame data as in operation 975, the image processing system sends the first portion of the image frame data to a device. The device may be an external device. The device may be a remote computing device, such as a remote server for storing image data and/or serving the stored image data. The device may be a display device, such as a display screen, a projector, a printer, or another type of display device. The device may be a computing system 1000. In some examples, to output at least the first portion of the image frame data, the image processing system is configured to, and can, output the image frame. For instance, if the predetermined region of the image frame buffer is at the end of the image frame buffer (or otherwise where the end of the image frame is expected to be), then operation 920 may indicate that the entirety of the image frame has been received, and can be output at operation 975.

In some examples, the stored data is marked with second metadata at a second predetermined region of the image frame buffer. The second metadata may be a second watermark, and may include any types of data discussed as included in the metadata and/or watermarks with respect to operation 905. In some examples, the image processing system can determine that the image frame data includes at least a second predetermined amount of the image frame based on a second read of the second predetermined region of the image frame buffer indicating that the second metadata is no longer stored in the second predetermined region. Any details discussed herein regarding operation 920 may apply to determining that the image frame data includes at least the second predetermined amount of the image frame. Determining that the image frame data includes at least the second predetermined amount of the image frame may correspond to operation 755 of FIG. 7. In some examples, the image processing system can output at least a second portion of the image frame data corresponding to the second predetermined amount of the image frame. Any details discussed herein regarding operation 975 may apply to outputting at least the second portion of the image frame data. Outputting at least the second portion of the image frame data may correspond to any of operations 755-775 of FIG. 7.

In some examples, to output the first portion of the image frame data as in operation 975, the image processing system determines one or more image statistics based on at least the first portion of the image frame data, for example as discussed with respect to the image statistics engine 810. The image processing system determines an image capture setting based on the one or more image statistics, for example as discussed with respect to the auto-exposure setting engine 815. In some examples, the image processing system sends the image capture setting to image capture hardware that includes the image sensor, for example as in the request loop 825, the hardware process capture request 830, and/or the frame request queue 835. The image processing system receives, from the image sensor, secondary image frame data corresponding to a second image frame, wherein the image sensor captures the second image frame based on the image capture setting. For example, the active sensor frame 855 (the image frame N+1) is captured based on the image capture setting that is determined by the auto-exposure setting engine 815, that is set and send to the kernel (operation 840), and that is written to hardware (operation 850) for use with the active sensor frame 855 (the image frame N+1). The image capture setting can be an exposure setting.

In some aspects, the image processing system can include: means for storing, in an image frame buffer, data marked with metadata at a predetermined region of the image frame buffer; means for receiving, from an image sensor, image frame data corresponding to an image frame; means for overwriting at least some of the stored data in the image frame buffer with the image frame data; means for determining that the image frame data includes at least a predetermined amount of the image frame based on a read of the predetermined region of the image frame buffer indicating that the predetermined region stores new data that is different than the metadata; and means for outputting at least a first portion of the image frame data corresponding to the predetermined amount of the image frame.

In some examples, the means for storing the data can include the image buffers 170, the image buffers 210, the image buffer 310, the individual image frame buffers 0 through 15 of the image buffer 310, the image frame buffer 315, the left image frame buffer 410, the right image frame buffer 415, the memory 1015, storage device 1030, the cache 1012, or a combination thereof. In some examples, the means for receiving the image frame data include the image sensor 130, the image processor 150, the ISP 154, the host processor 152, the I/O 156, the image capture device 105A, the image processing device 105B, the image capture and processing system 100, the camera(s) 205, camera(s) 305. In some examples, the means for overwriting at least some of the stored data can include the image buffers 170, the image buffers 210, the image buffer 310, the individual image frame buffers 0 through 15 of the image buffer 310, the image frame buffer 315, the left image frame buffer 410, the right image frame buffer 415, the memory 1015, storage device 1030, the cache 1012, or a combination thereof. In some examples, the means for determining that the image frame data includes at least the predetermined amount of the image frame can include the image processing device 105B, the image capture and processing system 100, the XR app 215, the GPU 325, the processor 1010, or a combination thereof. In some examples, the means for outputting at least the first portion of the image frame data can include the I/O 156, the I/O 160, the XR App 215, the XR SDK, the compositor 225, the display buffer 230, the display 235, the GPU 325, the display buffer 330, the display 335, the display interface pointer 530, the memory 1015, the storage device 1030, the cache 1012, the output device 1035, the communication interface 1040, or a combination thereof.

The image processing technique illustrated in the flow diagram 900 may also include any operation discussed illustrated in, or discussed with respect to, any of the conceptual diagrams, block diagrams, and flow diagrams 100, 200, 300, 500, 700, 800, 880, and/or 1000.

In some cases, at least a subset of the techniques illustrated by the any of the conceptual diagrams, block diagrams, and flow diagrams 100, 200, 300, 500, 700, 800, 880, 900, and/or 1000 may be performed remotely by one or more network servers of a cloud service. In some examples, the processes described herein (e.g., processes including those illustrated by the conceptual diagrams, block diagrams, and flow diagrams 200, 300, 500, 700, 800, 880, 900, and/or 1000, and/or other processes described herein) may be performed by a computing system or apparatus. In one example, the processes illustrated by the conceptual diagrams, block diagrams, and flow diagrams 100, 200, 300, 500, 700, 800, 880, 900, and/or 1000 can be performed by the image capture device 105A of FIG. 1. In another example, the processes illustrated by the conceptual diagrams, block diagrams, and flow diagrams 100, 200, 300, 500, 700, 800, 880, 900, and/or 1000 can be performed by the image processing device 105B of FIG. 1. The processes illustrated by the conceptual diagrams, block diagrams, and flow diagrams 100, 200, 300, 500, 700, 800, 880, 900, and/or 1000 can also be performed by the image capture and processing system 100 of FIG. 1. The processes illustrated by the conceptual diagrams, block diagrams, and flow diagrams 100, 200, 300, 500, 700, 800, 880, 900, and/or 1000 can be performed by the XR system 200 of FIG. 2. The processes illustrated by the conceptual diagrams, block diagrams, and flow diagrams 100, 200, 300, 500, 700, 800, 880, 900, and/or 1000 can be performed by the system illustrated in FIG. 3. The processes illustrated by the conceptual diagrams, block diagrams, and flow diagrams 100, 200, 300, 500, 700, 800, 880, 900, and/or 1000 can be performed by a computing system with the architecture of the computing system 1000 shown in FIG. 10. The computing system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes illustrated by the conceptual diagrams, block diagrams, and flow diagrams 100, 200, 300, 500, 700, 800, 880, 900, and/or 1000. In some cases, the computing system or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing system may include a display, a network interface configured to communicate and/or receive the data, any combination thereof, and/or other component(s). The network interface may be configured to communicate and/or receive Internet Protocol (IP) based data or other type of data.

The components of the computing system can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams, block diagrams, and flow diagrams 100, 200, 300, 500, 700, 800, 880, 900, and/or 1000 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams, block diagrams, and flow diagrams 100, 200, 300, 500, 700, 800, 880, 900, and/or 1000, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
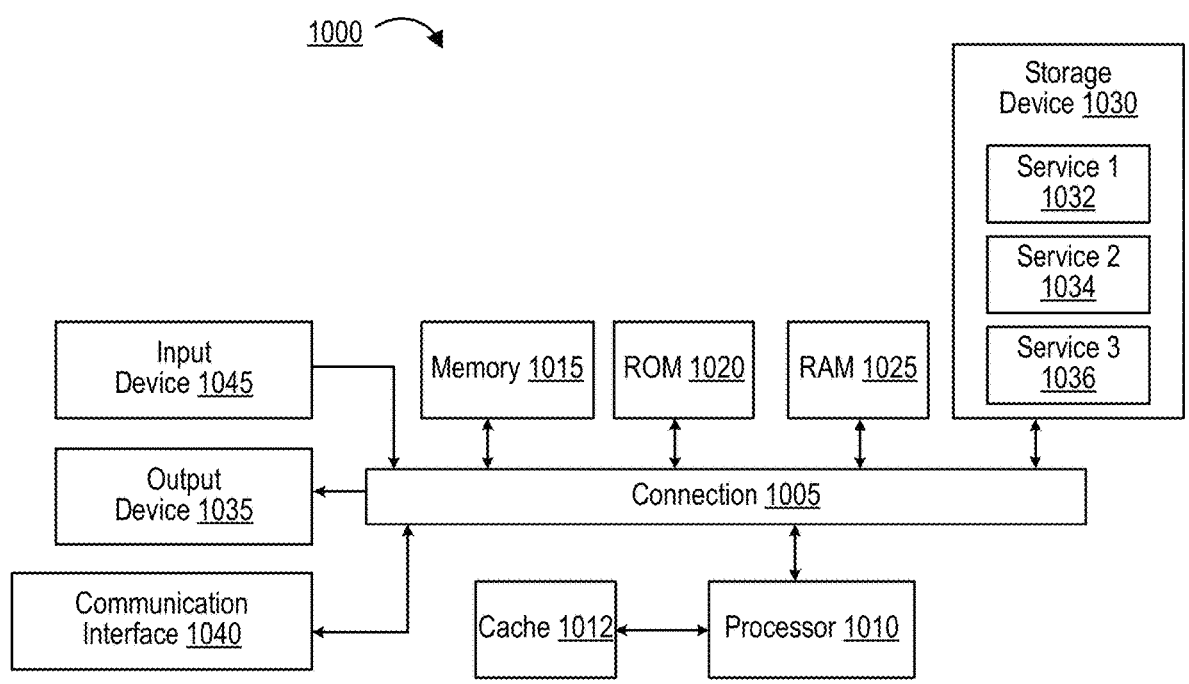
FIG. 10 is a diagram illustrating an example of a system for implementing certain aspects of the present technology, in accordance with some examples.

FIG. 10 is a diagram illustrating an example of a system for implementing certain aspects of the present technology. In particular, FIG. 10 illustrates an example of computing system 1000, which can be for example any computing device or computing system making up the image capture and processing system 100, the image capture device 105A, the image processing device 105B, the image processor 150, the host processor 152, the ISP 154, the XR system 200, the XR application 215, the compositor 225, the imaging system 300, the GPU 325, a system capturing and processing images according to the timeline 500, the imaging system 800, the imaging system 880, the CNN 1100, the Cifar-10 NN 1200, a remote computing system, a camera, any combination thereof, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for image processing, the apparatus comprising: a memory; and one or more processors coupled to the memory, the one or more processors configured to: store, in an image frame buffer, existing data marked with metadata at a predetermined region of the image frame buffer; receive new image frame data corresponding to a new image frame, the new image frame data being received by an image sensor; overwrite at least some of the existing data in the image frame buffer with the new image frame data; determine that the new image frame data includes at least a predetermined amount of the new image frame based on a read of the predetermined region of the image frame buffer indicating that the metadata is no longer stored in the predetermined region; and output at least a first portion of the new image frame data corresponding to the predetermined amount of the new image frame.

Aspect 2: The apparatus of Aspect 1, wherein, to output the first portion of the new image frame data, the one or more processors are configured to send the first portion of the new image frame data to an extended reality (XR) application.

Aspect 3: The apparatus of any of Aspects 1 to 2, wherein, to output the first portion of the new image frame data, the one or more processors are configured to process the first portion of the new image frame data using an extended reality (XR) application.

Aspect 4: The apparatus of any of Aspects 1 to 3 wherein, to output the first portion of the new image frame data, the one or more processors are configured to composite the first portion of the new image frame data with virtual content.

Aspect 5: The apparatus of any of Aspects 1 to 4 wherein, to output the first portion of the new image frame data, the one or more processors are configured to warp at least some of the first portion of the new image frame data.

Aspect 6: The apparatus of any of Aspects 1 to 5 wherein, to output the first portion of the new image frame data, the one or more processors are configured to distort at least some of the first portion of the new image frame data.

Aspect 7: The apparatus of any of Aspects 1 to 6 wherein, to output the first portion of the new image frame data, the one or more processors are configured to perform distortion compensation on at least some of the first portion of the new image frame data.

Aspect 8: The apparatus of any of Aspects 1 to 7 wherein, to output the first portion of the new image frame data, the one or more processors store the first portion of the new image frame data in a display buffer.

Aspect 9: The apparatus of any of Aspects 1 to 8 further comprising: the display buffer.

Aspect 10: The apparatus of any of Aspects 1 to 9 wherein, to output the first portion of the new image frame data, the one or more processors display the first portion of the new image frame data using a display.

Aspect 11: The apparatus of any of Aspects 1 to 10, further comprising: the display.

Aspect 12: The apparatus of any of Aspects 1 to 11, wherein, to output the first portion of the new image frame data, the one or more processors send the first portion of the new image frame data to a device.

Aspect 13: The apparatus of any of Aspects 1 to 12, wherein, to determine that the new image frame data includes at least a predetermined amount of the new image frame, the one or more processors are configured to: read the predetermined region of the image frame buffer; and identify, based on reading the predetermined region of the image frame buffer, that the metadata in the predetermined region of the image frame buffer has been overwritten.

Aspect 14: The apparatus of any of Aspects 1 to 13, wherein the metadata includes a pattern of colors.

Aspect 15: The apparatus of any of Aspects 1 to 14, wherein the metadata includes a frame identifier associated with the new image frame.

Aspect 16: The apparatus of any of Aspects 1 to 15, wherein the metadata includes an image frame buffer identifier associated with the image frame buffer.

Aspect 17: The apparatus of any of Aspects 1 to 16, wherein the one or more processors are configured to: modify the existing data to mark the existing data with the metadata at the predetermined region of the image frame buffer.

Aspect 18: The apparatus of any of Aspects 1 to 17, wherein the apparatus is one of a mobile device, a wireless communication device, a head-mounted display, and a camera.

Aspect 19: The apparatus of any of Aspects 1 to 18, further comprising: the image sensor.

Aspect 20: The apparatus of any of Aspects 1 to 19, further comprising: the image frame buffer.

Aspect 21: The apparatus of any of Aspects 1 to 20, wherein the existing data is prior image frame data from a prior image frame, the prior image frame captured before capture of the new image frame.

Aspect 22: The apparatus of any of Aspects 1 to 21, wherein the metadata includes a watermark.

Aspect 23: The apparatus of any of Aspects 1 to 22, wherein the predetermined amount of the new image frame includes a predetermined percentage of the new image frame.

Aspect 24: The apparatus of any of Aspects 1 to 23, wherein the predetermined amount of the new image frame includes a predetermined fraction of the new image frame.

Aspect 25: The apparatus of any of Aspects 1 to 24, wherein the predetermined amount of the new image frame includes a predetermined number of rows of the new image frame.

Aspect 26: The apparatus of any of Aspects 1 to 25, wherein the predetermined amount of the new image frame includes a predetermined number of columns of the new image frame.

Aspect 27: The apparatus of any of Aspects 1 to 26, wherein the predetermined amount of the new image frame includes a predetermined number of pixels of the new image frame.

Aspect 28: The apparatus of any of Aspects 1 to 27, wherein to output at least the first portion of the new image frame data, the one or more processors are configured to output the new image frame.

Aspect 29: The apparatus of any of Aspects 1 to 28, wherein the existing data is marked with second metadata at a second predetermined region of the image frame buffer.

Aspect 30: The apparatus of any one of any of Aspects 1 to 29 to 29, wherein the one or more processors are configured to: determine that the new image frame data includes at least a second predetermined amount of the new image frame based on a second read of the second predetermined region of the image frame buffer indicating that the second metadata is no longer stored in the second predetermined region; and output at least a second portion of the new image frame data corresponding to the second predetermined amount of the new image frame.

Aspect 31: A method of image processing, the method comprising: storing, in an image frame buffer, existing data marked with a watermark at a predetermined region of the image frame buffer; receiving new image frame data corresponding to a new image frame, the new image frame data being received by an image sensor; overwriting at least some of the existing data in the image frame buffer with the new image frame data; determining that the new image frame data includes at least a predetermined amount of the new image frame based on a read of the predetermined region of the image frame buffer indicating that the metadata is no longer stored in the predetermined region; and outputting at least a first portion of the new image frame data corresponding to the predetermined amount of the new image frame.

Aspect 32: The method of Aspect 31, further comprising any of Aspects 2 to 30.

Aspect 33: A non-transitory computer-readable medium having stored thereon instructions that, when executed by one or more processors, cause the one or more processors to: store, in an image frame buffer, existing data marked with metadata at a predetermined region of the image frame buffer; receive new image frame data corresponding to a new image frame, the new image frame data being received by an image sensor; overwrite at least some of the existing data in the image frame buffer with the new image frame data; determine that the new image frame data includes at least a predetermined amount of the new image frame based on a read of the predetermined region of the image frame buffer indicating that the metadata is no longer stored in the predetermined region; and output at least a first portion of the new image frame data corresponding to the predetermined amount of the new image frame.

Aspect 34: The non-transitory computer-readable medium of Aspect 33, further comprising any of Aspects 2 to 30.

Aspect 35: An apparatus for image processing, the apparatus comprising: means for storing, in an image frame buffer, existing data marked with a watermark at a predetermined region of the image frame buffer; means for receiving new image frame data corresponding to a new image frame, the new image frame data being received by an image sensor; means for overwriting at least some of the existing data in the image frame buffer with the new image frame data; means for determining that the new image frame data includes at least a predetermined amount of the new image frame based on a read of the predetermined region of the image frame buffer indicating that the metadata is no longer stored in the predetermined region; and means for outputting at least a first portion of the new image frame data corresponding to the predetermined amount of the new image frame.

Aspect 36: The apparatus of Aspect 35, further comprising any of Aspects 2 to 30.

Aspect 37: An apparatus for image processing, the apparatus comprising: a memory; and one or more processors coupled to the memory, the one or more processors configured to: store, in an image frame buffer, data marked with metadata at a predetermined region of the image frame buffer; receive, from an image sensor, image frame data corresponding to an image frame; overwrite at least some of the stored data in the image frame buffer with the image frame data; determine that the image frame data includes at least a predetermined amount of the image frame based on a read of the predetermined region of the image frame buffer indicating that the predetermined region stores additional data that is different than the metadata; and output at least a first portion of the image frame data corresponding to the predetermined amount of the image frame.

Aspect 38: The apparatus of Aspect 37, wherein the additional data is at least a portion of the image frame data.

Aspect 39: The apparatus of any of Aspects 37 to 38, wherein, to output the first portion of the image frame data, the one or more processors are configured to process the first portion of the image frame data.

Aspect 40: The apparatus of Aspect 39, wherein, to process the first portion of the image frame data, the one or more processors are configured to modify at least some of the first portion of the image frame data using at least one of a distortion, a distortion compensation, and a warping.

Aspect 41: The apparatus of any of Aspects 39 to 40, wherein, to process the first portion of the image frame data, the one or more processors are configured to composite the first portion of the image frame data with virtual content.

Aspect 42: The apparatus of Aspect 41, wherein the one or more processors are configured to further: identify a pose of the image sensor; and render the virtual content based on a pose of the image sensor.

Aspect 43: The apparatus of any of Aspects 37 to 42, wherein, to output the first portion of the image frame data, the one or more processors are configured to display the first portion of the image frame data using a display.

Aspect 44: The apparatus of Aspect 43, further comprising: the display.

Aspect 45: The apparatus of any of Aspects 37 to 44, wherein, to output the first portion of the image frame data, the one or more processors are configured to store the first portion of the image frame data in a display buffer.

Aspect 46: The apparatus of Aspect 45, further comprising: the display buffer.

Aspect 47: The apparatus of any of Aspects 37 to 46, wherein, to output the first portion of the image frame data, the one or more processors are configured to send the first portion of the image frame data to a recipient device using a communication transceiver.

Aspect 48: The apparatus of Aspect 47, further comprising: the communication transceiver.

Aspect 49: The apparatus of any of Aspects 37 to 48, wherein, to output the first portion of the image frame data, the one or more processors are configured to: determine one or more image statistics based on at least the first portion of the image frame data; and determine an image capture setting based on the one or more image statistics.

Aspect 50: The apparatus of Aspect 49, wherein the one or more processors are configured to further: send the image capture setting to image capture hardware, wherein the image capture hardware includes the image sensor; and receive, from the image sensor, secondary image frame data corresponding to a second image frame, wherein the image sensor captures the second image frame based on the image capture setting.

Aspect 51: The apparatus of any of Aspects 49 to 50, wherein the image capture setting is an exposure setting.

Aspect 52: The apparatus of any of Aspects 37 to 51, wherein the one or more processors are configured to further: mark the stored data with the metadata at the predetermined region of the image frame buffer.

Aspect 53: The apparatus of any of Aspects 37 to 52, wherein the metadata includes a pattern of colors.

Aspect 54: The apparatus of any of Aspects 37 to 53, wherein the metadata includes a frame identifier associated with the image frame.

Aspect 55: The apparatus of any of Aspects 37 to 54, wherein, to determine that the image frame data includes at least the predetermined amount of the image frame, the one or more processors are configured to: read the predetermined region of the image frame buffer; and determine, based on the read of the predetermined region of the image frame buffer, that the read indicates that the predetermined region stores the additional data that is different than the metadata.

Aspect 56: The apparatus of any of Aspects 37 to 55, wherein the stored data includes prior image frame data from a prior image frame, the prior image frame captured by the image sensor before capture of the image frame.

Aspect 57: The apparatus of any of Aspects 37 to 56, wherein, to output at least the first portion of the image frame data, the one or more processors are configured to output the image frame.

Aspect 58: The apparatus of any of Aspects 37 to 57, wherein the stored data is marked with second metadata at a second predetermined region of the image frame buffer.

Aspect 59: The apparatus of Aspect 58, wherein the one or more processors are configured to: determine that the image frame data includes at least a second predetermined amount of the image frame based on a second read of the second predetermined region of the image frame buffer indicating that the second predetermined region stores secondary additional data that is different than the second metadata; and output at least a second portion of the image frame data corresponding to the second predetermined amount of the image frame.

Aspect 60: The apparatus of any of Aspects 37 to 59, wherein the one or more processors are configured to: receive a request for a view of a scene; and expose the image sensor to light from the scene automatically in response to receipt of the request, wherein the image frame data received from the image sensor is based on exposure of the image sensor to the light from the scene.

Aspect 61: The apparatus of any of Aspects 37 to 60, further comprising: the image sensor.

Aspect 62: The apparatus of any of Aspects 37 to 61, further comprising: the image frame buffer.

Aspect 63: The apparatus of any of Aspects 37 to 62, wherein the apparatus is a head-mounted display.

Aspect 64: A method of image processing, the method comprising: storing, in an image frame buffer, data marked with metadata at a predetermined region of the image frame buffer; receiving, from an image sensor, image frame data corresponding to an image frame; overwriting at least some of the stored data in the image frame buffer with the image frame data; determining that the image frame data includes at least a predetermined amount of the image frame based on a read of the predetermined region of the image frame buffer indicating that the predetermined region stores additional data that is different than the metadata; and outputting at least a first portion of the image frame data corresponding to the predetermined amount of the image frame.

Aspect 65: The method of Aspect 64, wherein the additional data is at least a portion of the image frame data.

Aspect 67: The method of any of Aspects 64 to 65, wherein outputting the first portion of the image frame data includes processing the first portion of the image frame data.

Aspect 68: The method of Aspect 67, wherein processing the first portion of the image frame data includes modifying at least some of the first portion of the image frame data using at least one of a distortion, a distortion compensation, and a warping.

Aspect 69: The method of any of Aspects 67 to 68, wherein processing the first portion of the image frame data includes compositing the first portion of the image frame data with virtual content.

Aspect 70: The method of Aspect 69, further comprising: identifying a pose of the image sensor; and rendering the virtual content based on a pose of the image sensor.

Aspect 71: The method of any of Aspects 64 to 70, wherein outputting the first portion of the image frame data includes displaying the first portion of the image frame data using a display.

Aspect 72: The method of Aspect 71, wherein the method is performed by a system that includes the display.

Aspect 73: The method of any of Aspects 64 to 72, wherein outputting the first portion of the image frame data includes storing the first portion of the image frame data in a display buffer.

Aspect 74: The method of Aspect 73, wherein the method is performed by a system that includes the display buffer.

Aspect 75: The method of any of Aspects 64 to 74, wherein outputting the first portion of the image frame data includes sending the first portion of the image frame data to a recipient device using a communication transceiver.

Aspect 76: The method of Aspect 75, wherein the method is performed by a system that includes the communication transceiver.

Aspect 77: The method of any of Aspects 64 to 76, wherein outputting the first portion of the image frame data includes: determining one or more image statistics based on at least the first portion of the image frame data; and determining an image capture setting based on the one or more image statistics.

Aspect 78: The method of Aspect 77, further comprising: sending the image capture setting to image capture hardware, wherein the image capture hardware includes the image sensor; and receiving, from the image sensor, secondary image frame data corresponding to a second image frame, wherein the image sensor captures the second image frame based on the image capture setting.

Aspect 79: The method of any of Aspects 77 to 78, wherein the image capture setting is an exposure setting.

Aspect 80: The method of any of Aspects 64 to 79, further comprising: marking the stored data with the metadata at the predetermined region of the image frame buffer.

Aspect 81: The method of any of Aspects 64 to 80, wherein the metadata includes a pattern of colors.

Aspect 82: The method of any of Aspects 64 to 81, wherein the metadata includes a frame identifier associated with the image frame.

Aspect 83: The method of any of Aspects 64 to 82, wherein determining that the image frame data includes at least the predetermined amount of the image frame includes: reading the predetermined region of the image frame buffer; and determining, based on the read of the predetermined region of the image frame buffer, that the read indicates that the predetermined region stores the additional data that is different than the metadata.

Aspect 84: The method of any of Aspects 64 to 83, wherein the stored data includes prior image frame data from a prior image frame, the prior image frame captured by the image sensor before capture of the image frame.

Aspect 85: The method of any of Aspects 64 to 84, wherein outputting at least the first portion of the image frame data includes outputting the image frame.

Aspect 86: The method of any of Aspects 64 to 85, wherein the stored data is marked with second metadata at a second predetermined region of the image frame buffer.

Aspect 87: The method of Aspect 86, further comprising: determining that the image frame data includes at least a second predetermined amount of the image frame based on a second read of the second predetermined region of the image frame buffer indicating that the second predetermined region stores secondary additional data that is different than the second metadata; and outputting at least a second portion of the image frame data corresponding to the second predetermined amount of the image frame.

Aspect 88: The method of any of Aspects 64 to 87, further comprising: receiving a request for a view of a scene; and exposing the image sensor to light from the scene automatically in response to receipt of the request, wherein the image frame data received from the image sensor is based on exposure of the image sensor to the light from the scene.

Aspect 89: The method of any of Aspects 64 to 88, wherein the method is performed by a system that includes the image sensor.

Aspect 90: The method of any of Aspects 64 to 89, wherein the method is performed by a system that includes the image frame buffer.

Aspect 91: The method of any of Aspects 64 to 90, wherein the method is performed by a head-mounted display.

Aspect 92: A non-transitory computer-readable medium having stored thereon instructions that, when executed by one or more processors, cause the one or more processors to: store, in an image frame buffer, data marked with metadata at a predetermined region of the image frame buffer; receive, from an image sensor, image frame data corresponding to an image frame; overwrite at least some of the stored data in the image frame buffer with the image frame data; determine that the image frame data includes at least a predetermined amount of the image frame based on a read of the predetermined region of the image frame buffer indicating that the predetermined region stores additional data that is different than the metadata; and output at least a first portion of the image frame data corresponding to the predetermined amount of the image frame.

Aspect 93: The non-transitory computer-readable medium of Aspect 92, further comprising any of Aspects 38 to 63, and/or any of Aspects 65 to 91.

Aspect 94: An apparatus for image processing, the apparatus comprising: means for storing, in an image frame buffer, data marked with metadata at a predetermined region of the image frame buffer; means for receiving, from an image sensor, image frame data corresponding to an image frame; means for overwriting at least some of the stored data in the image frame buffer with the image frame data; means for determining that the image frame data includes at least a predetermined amount of the image frame based on a read of the predetermined region of the image frame buffer indicating that the predetermined region stores additional data that is different than the metadata; and means for outputting at least a first portion of the image frame data corresponding to the predetermined amount of the image frame.

Aspect 95: The apparatus of Aspect 94, further comprising any of Aspects 38 to 63, and/or any of Aspects 65 to 91.

Aspect 96: An apparatus for image processing, the apparatus comprising: a memory; and one or more processors coupled to the memory, the one or more processors configured to: store, in an image frame buffer, data marked with metadata at a predetermined region of the image frame buffer; receive a request for a view of a scene; expose an image sensor to light from the scene automatically in response to receipt of the request; receive, from the image sensor, image frame data corresponding to an image frame, wherein the image frame data received from the image sensor is based on exposure of the image sensor to the light from the scene; overwrite at least some of the stored data in the image frame buffer with the image frame data; determine that the image frame data includes at least a predetermined amount of the image frame based on a read of the predetermined region of the image frame buffer indicating that the predetermined region stores additional data that is different than the metadata; and output at least a first portion of the image frame data corresponding to the predetermined amount of the image frame.

Aspect 97: The apparatus of Aspect 96, further comprising any of Aspects 38 to 63.

Aspect 98: A method of image processing, the method comprising: storing, in an image frame buffer, data marked with metadata at a predetermined region of the image frame buffer; receiving a request for a view of a scene; exposing an image sensor to light from the scene automatically in response to receipt of the request; receiving, from the image sensor, image frame data corresponding to an image frame, wherein the image frame data received from the image sensor is based on exposure of the image sensor to the light from the scene; overwriting at least some of the stored data in the image frame buffer with the image frame data; determining that the image frame data includes at least a predetermined amount of the image frame based on a read of the predetermined region of the image frame buffer indicating that the predetermined region stores additional data that is different than the metadata; and outputting at least a first portion of the image frame data corresponding to the predetermined amount of the image frame.

Aspect 99: The method of Aspect 98, further comprising any of Aspects 65 to 91.

Aspect 100: A non-transitory computer-readable medium having stored thereon instructions that, when executed by one or more processors, cause the one or more processors to: store, in an image frame buffer, data marked with metadata at a predetermined region of the image frame buffer; receive a request for a view of a scene; expose an image sensor to light from the scene automatically in response to receipt of the request; receive, from the image sensor, image frame data corresponding to an image frame, wherein the image frame data received from the image sensor is based on exposure of the image sensor to the light from the scene; overwrite at least some of the stored data in the image frame buffer with the image frame data; determine that the image frame data includes at least a predetermined amount of the image frame based on a read of the predetermined region of the image frame buffer indicating that the predetermined region stores additional data that is different than the metadata; and output at least a first portion of the image frame data corresponding to the predetermined amount of the image frame.

Aspect 101: The non-transitory computer-readable medium of Aspect 100, further comprising any of Aspects 38 to 63, and/or any of Aspects 65 to 91.

Aspect 102: An apparatus for image processing, the apparatus comprising: means for storing, in an image frame buffer, data marked with metadata at a predetermined region of the image frame buffer; means for receiving a request for a view of a scene; means for exposing an image sensor to light from the scene automatically in response to receipt of the request; means for receiving, from the image sensor, image frame data corresponding to an image frame, wherein the image frame data received from the image sensor is based on exposure of the image sensor to the light from the scene; means for overwriting at least some of the stored data in the image frame buffer with the image frame data; means for determining that the image frame data includes at least a predetermined amount of the image frame based on a read of the predetermined region of the image frame buffer indicating that the predetermined region stores additional data that is different than the metadata; and means for outputting at least a first portion of the image frame data corresponding to the predetermined amount of the image frame.

Aspect 103: The apparatus of Aspect 102, further comprising any of Aspects 38 to 63, and/or any of Aspects 65 to 91.

What is claimed is:

1. An apparatus for image processing, the apparatus comprising:
   a memory; and
   one or more processors coupled to the memory, the one or more processors configured to:
   store, in an image frame buffer, data marked with metadata at a predetermined region of the image frame buffer;
   receive, from an image sensor, image frame data corresponding to an image frame;
   overwrite at least some of the stored data in the image frame buffer with the image frame data;
   determine that the image frame data includes at least a predetermined amount of the image frame based on a read of the predetermined region of the image frame buffer indicating that the predetermined region stores additional data that is different than the metadata; and
   output at least a first portion of the image frame data corresponding to the predetermined amount of the image frame.

2. The apparatus of claim 1, wherein the additional data is at least a portion of the image frame data.

3. The apparatus of claim 1, wherein, to output the first portion of the image frame data, the one or more processors are configured to process the first portion of the image frame data.

4. The apparatus of claim 3, wherein, to process the first portion of the image frame data, the one or more processors are configured to modify at least some of the first portion of the image frame data using at least one of a distortion, a distortion compensation, and a warping.

5. The apparatus of claim 3, wherein, to process the first portion of the image frame data, the one or more processors are configured to composite the first portion of the image frame data with virtual content.

6. The apparatus of claim 5, wherein the one or more processors are configured to further:
   identify a pose of the image sensor; and
   render the virtual content based on a pose of the image sensor.

7. The apparatus of claim 1, further comprising:
   a display, wherein, to output the first portion of the image frame data, the one or more processors are configured to display the first portion of the image frame data using the display.

8. The apparatus of claim 1, further comprising:
   a display buffer, wherein, to output the first portion of the image frame data, the one or more processors are configured to store the first portion of the image frame data in the display buffer.

9. The apparatus of claim 1, wherein, to output the first portion of the image frame data, the one or more processors are configured to:
   determine one or more image statistics based on at least the first portion of the image frame data; and
   determine an image capture setting based on the one or more image statistics.

10. The apparatus of claim 9, wherein the one or more processors are configured to further:
    send the image capture setting to image capture hardware, wherein the image capture hardware includes the image sensor; and
    receive, from the image sensor, secondary image frame data corresponding to a second image frame, wherein the image sensor captures the second image frame based on the image capture setting.

11. The apparatus of claim 10, wherein the image capture setting is an exposure setting.

12. The apparatus of claim 1, wherein the one or more processors are configured to further:
    mark the stored data with the metadata at the predetermined region of the image frame buffer.

13. The apparatus of claim 1, wherein the metadata includes a pattern of colors.

14. The apparatus of claim 1, wherein the metadata includes a frame identifier associated with the image frame.

15. The apparatus of claim 1, wherein, to determine that the image frame data includes at least the predetermined amount of the image frame, the one or more processors are configured to:
    read the predetermined region of the image frame buffer; and
    determine, based on the read of the predetermined region of the image frame buffer, that the read indicates that the predetermined region stores the additional data that is different than the metadata.

16. The apparatus of claim 1, wherein the stored data includes prior image frame data from a prior image frame, the prior image frame captured by the image sensor before capture of the image frame.

17. The apparatus of claim 1, wherein, to output at least the first portion of the image frame data, the one or more processors are configured to output the image frame.

18. The apparatus of claim 1, wherein the stored data is marked with second metadata at a second predetermined region of the image frame buffer.

19. The apparatus of claim 18, wherein the one or more processors are configured to:
    determine that the image frame data includes at least a second predetermined amount of the image frame based on a second read of the second predetermined region of the image frame buffer indicating that the second predetermined region stores secondary additional data that is different than the second metadata; and
    output at least a second portion of the image frame data corresponding to the second predetermined amount of the image frame.

20. The apparatus of claim 1, wherein the one or more processors are configured to:
    receive a request for a view of a scene; and
    expose the image sensor to light from the scene automatically in response to receipt of the request, wherein the image frame data received from the image sensor is based on exposure of the image sensor to the light from the scene.

21. The apparatus of claim 1, further comprising:
    the image sensor.

22. The apparatus of claim 1, further comprising:
    the image frame buffer.

23. The apparatus of claim 1, wherein the apparatus is a head-mounted display.

24. A method of image processing, the method comprising:
    storing, in an image frame buffer, data marked with metadata at a predetermined region of the image frame buffer;
    receiving, from an image sensor, image frame data corresponding to an image frame;

overwriting at least some of the stored data in the image frame buffer with the image frame data;

determining that the image frame data includes at least a predetermined amount of the image frame based on a read of the predetermined region of the image frame buffer indicating that the predetermined region stores additional data that is different than the metadata; and outputting at least a first portion of the image frame data corresponding to the predetermined amount of the image frame.

25. The method of claim 24, wherein the additional data is at least a portion of the image frame data.

26. The method of claim 24, wherein outputting the first portion of the image frame data includes processing the first portion of the image frame data.

27. The method of claim 24, wherein outputting the first portion of the image frame data includes displaying the first portion of the image frame data using a display.

28. The method of claim 24, wherein outputting the first portion of the image frame data includes storing the first portion of the image frame data in a display buffer.

29. The method of claim 24, further comprising:
marking the stored data with the metadata at the predetermined region of the image frame buffer.

30. The method of claim 24, further comprising:
receiving a request for a view of a scene; and
exposing the image sensor to light from the scene automatically in response to receipt of the request, wherein the image frame data received from the image sensor is based on exposure of the image sensor to the light from the scene.

* * * * *